United States Patent
Xu et al.

(10) Patent No.: US 8,937,923 B2
(45) Date of Patent: Jan. 20, 2015

(54) APPARATUS AND METHOD FOR HANDOVER/ROAMING DURING FILE DOWNLOADING/STREAMING

(75) Inventors: Yiling Xu, Suwon-si (KR); Young-Wan So, Gunpo-si (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 489 days.

(21) Appl. No.: 12/576,734

(22) Filed: Oct. 9, 2009

(65) Prior Publication Data

US 2010/0091737 A1    Apr. 15, 2010

(30) Foreign Application Priority Data

Oct. 9, 2008   (KR) .................. 10-2008-0099090
Oct. 16, 2008  (KR) .................. 10-2008-0101534
Aug. 28, 2009  (KR) .................. 10-2009-0080462

(51) Int. Cl.
*H04W 72/00*    (2009.01)

(52) U.S. Cl.
USPC ........................................................ 370/331

(58) Field of Classification Search
USPC ........................................................ 370/331
See application file for complete search history.

(56) References Cited

U.S. PATENT DOCUMENTS

| | | | |
|---|---|---|---|
| 7,296,091 B1* | 11/2007 | Dutta et al. ................... | 709/245 |
| 2004/0045029 A1* | 3/2004 | Matsuura ........................ | 725/93 |
| 2004/0225878 A1* | 11/2004 | Costa-Requena et al. ..... | 713/150 |
| 2004/0233866 A1* | 11/2004 | Bossoli et al. ................ | 370/328 |
| 2006/0262751 A1* | 11/2006 | Vermola et al. ................ | 370/331 |
| 2007/0209051 A1* | 9/2007 | Xu et al. ........................ | 725/63 |
| 2007/0220558 A1 | 9/2007 | Jung et al. | |
| 2007/0300275 A1* | 12/2007 | Kim et al. ..................... | 725/112 |
| 2009/0191878 A1* | 7/2009 | Hedqvist et al. .............. | 455/441 |

FOREIGN PATENT DOCUMENTS

| | | |
|---|---|---|
| KR | 1020070109800 | 11/2007 |
| KR | 1020080043038 | 5/2008 |

* cited by examiner

*Primary Examiner* — Sulaiman Nooristany
(74) *Attorney, Agent, or Firm* — The Farrell Law Firm, P.C.

(57) ABSTRACT

Apparatuses and methods for handover or roaming during a file download or streaming. A streaming roaming method in a Convergence of Broadcast and Mobile Services (CBMS) system includes generating a Session Description Protocol (SDP), a fragment, or a notification message indicating streaming roaming or handover information, and transmitting the SDP, the fragment, or the notification message to a terminal.

12 Claims, 30 Drawing Sheets

APPARATUS AND METHOD FOR HANDOVER/ROAMING DURING FILE DOWNLOADING/STREAMING

PRIORITY

This application claims priority under 35 U.S.C. §119(a) to Korean patent applications filed in the Korean Intellectual Property Office on Oct. 9, 2008, Oct. 16, 2008, and Aug. 28, 2009, which were assigned Serial Nos. 10-2008-0099090, 10-2008-0101534, and 10-2009-0080462, respectively, and the disclosures of which are incorporated herein by reference.

BACKGROUND OF THE INVENTION

1. Field of the Invention

The present invention relates generally to apparatuses and methods for handover or roaming during file download or streaming.

2. Description of the Related Art

In a Convergence of Broadcast and Mobile Services (CBMS) system, a receiver or a terminal (hereafter, referred to as a terminal) can download or stream a file. The terminal can move to another reception source, that is, hand over or roam to another reception source. Disadvantageously, after the handover or the roaming, it normally takes a considerable amount of time for the terminal to restart the reception of information required to continue the previous file download or streaming. In this respect, an apparatus and a method are needed for more efficiently continuing the downloading or streaming when the terminal hands over or roams to another reception source.

SUMMARY OF THE INVENTION

The present invention has been designed to address at least the problems and/or disadvantages described above and to provide at least the advantages described below.

Accordingly, an aspect of the present invention is to provide an apparatus and method for handover or roaming during a file download or streaming.

In accordance with an aspect of the present invention, an apparatus of a server for managing roaming or handover in a Convergence of Broadcast and Mobile Services (CBMS) system includes a service manager for generating a Session Description Protocol (SDP), a fragment, or a notification message indicative of streaming roaming or handover information, and for transmitting the SDP, the fragment, or the notification message to a terminal.

In accordance with another aspect of the present invention, an apparatus of a terminal for performing roaming or handover in a CBMS system includes a mobility manager for receiving a SDP, a fragment, or a notification message indicative of streaming roaming or handover information through a broadcast receiver, and for maintaining a previously received streaming using the streaming roaming or handover information through the broadcast receiver after the roaming or the handover.

In accordance with another aspect of the present invention, a method of a server for roaming or handover in a CBMS system includes generating a SDP, a fragment, or a notification message indicative of streaming roaming or handover information; and transmitting the SDP, the fragment, or the notification message to a terminal.

In accordance with another aspect of the present invention, a method of a terminal for roaming or handover in a CBMS system includes receiving a SDP, a fragment, or a notification message indicative of streaming roaming or handover information; and maintaining a previously received streaming using the streaming roaming or handover information, after the roaming or the handover.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EMBODIMENTS OF THE PRESENT INVENTION

The following description, with reference to the accompanying drawings, is provided to assist in a comprehensive understanding of certain embodiments of the present invention as defined by the claims and their equivalents. Although the description includes various specific details to assist in the understanding, these are to be regarded as merely exemplary. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

As indicated above, in accordance with an embodiment of the present invention, apparatuses and methods are provided for handover or roaming during a file download or streaming. The following description of the embodiments will mostly illustrate the handover, by way of example, although the present invention is applicable to roaming also.

When a terminal changes its reception source to a service reception source belonging to a home Internet Protocol Data Cast (IPDC) provider, this change corresponds to a handover. When the terminal changes its service reception source from a current IPDC provider to another IPDC provider, this corresponds to roaming. When the present invention is applied to roaming, the concept corresponding to the handover of the present invention can be replaced by the concept corresponding to the roaming. As indicated above, the suggested concept of the present invention can be applied to both of the handover and roaming. However, for example, in the case of roaming, several authentications may be required. Basically, while some of the actual procedures may differ between the handover and roaming, the main concept is the same.

As indicated above, the various embodiments of the present invention will be described using a handover by way of example. Further, the present invention will be described in two sections. The first section will be directed to a handover during a file download, and the second section will be directed to a handover during streaming.

Figure 1:
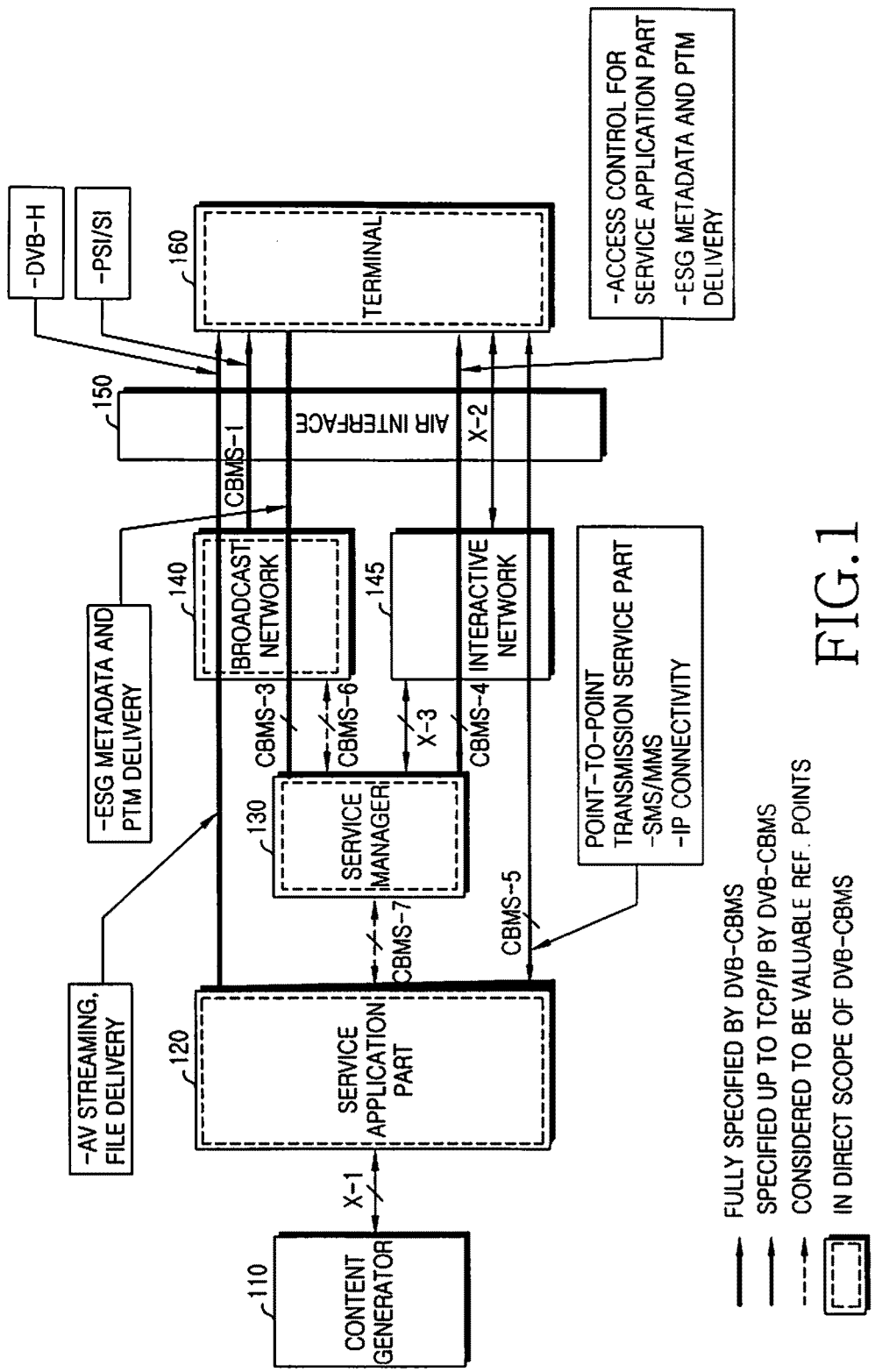
FIG. 1 is a diagram of a Convergence of Broadcast and Mobile Services (CBMS) structure according to an embodiment of the present invention.

FIG. 1 illustrates a Convergence of Broadcast and Mobile Services (CBMS) structure according to an embodiment of the present invention.

Referring to FIG. 1, an IP datacast in a Digital Video Broadcasting-Handheld (DVB-H) system includes a content generator 110, a service application part 120, a service manager 130, and a terminal 160. The content generator 110 creates and provides content to a service application part 120 that aggregates content from various sources and metadata relating to the sources, and then provides a service application.

The service manager 130 includes a broadcast network 140 and an interactive network 145. The service application is transferred to a terminal 160 over the broadcast network 140 and the interactive network 145.

In the CBMS, the terminal 160 can receive the service and the signal over the broadcast network 140, and conduct the bidirectional communication over the interactive network 145. That is, the signaling information transmitted from the terminal 160 is provided to the service application part 120 over the interactive network 145.

Herein, CBMS-x and X-x are reference points between the different function entities. CBMS-x is the reference point in the scope of the IP datacast according to the DVB-H standard, and X-x is the reference point in the scope of the IP datacast outside the DVB-H standard.

When downloading a file, the terminal 160 may change the reception source for a number of reasons, e.g., when the terminal cannot receive the original signal any more. When handing over to a new reception source, the terminal 160 needs to continuously request the download of a new or similar file.

When the terminal 160 hands over to the new reception source, the present invention considers two cases. The first case is a handover for the broadcast network 140 and the second is a handover for the interactive network 145. In either case, in order for the terminal 160 to continue the download, it requires essential information.

Case 1: a handover with respect to another broadcast Transport Stream (TS).

Figure 2:
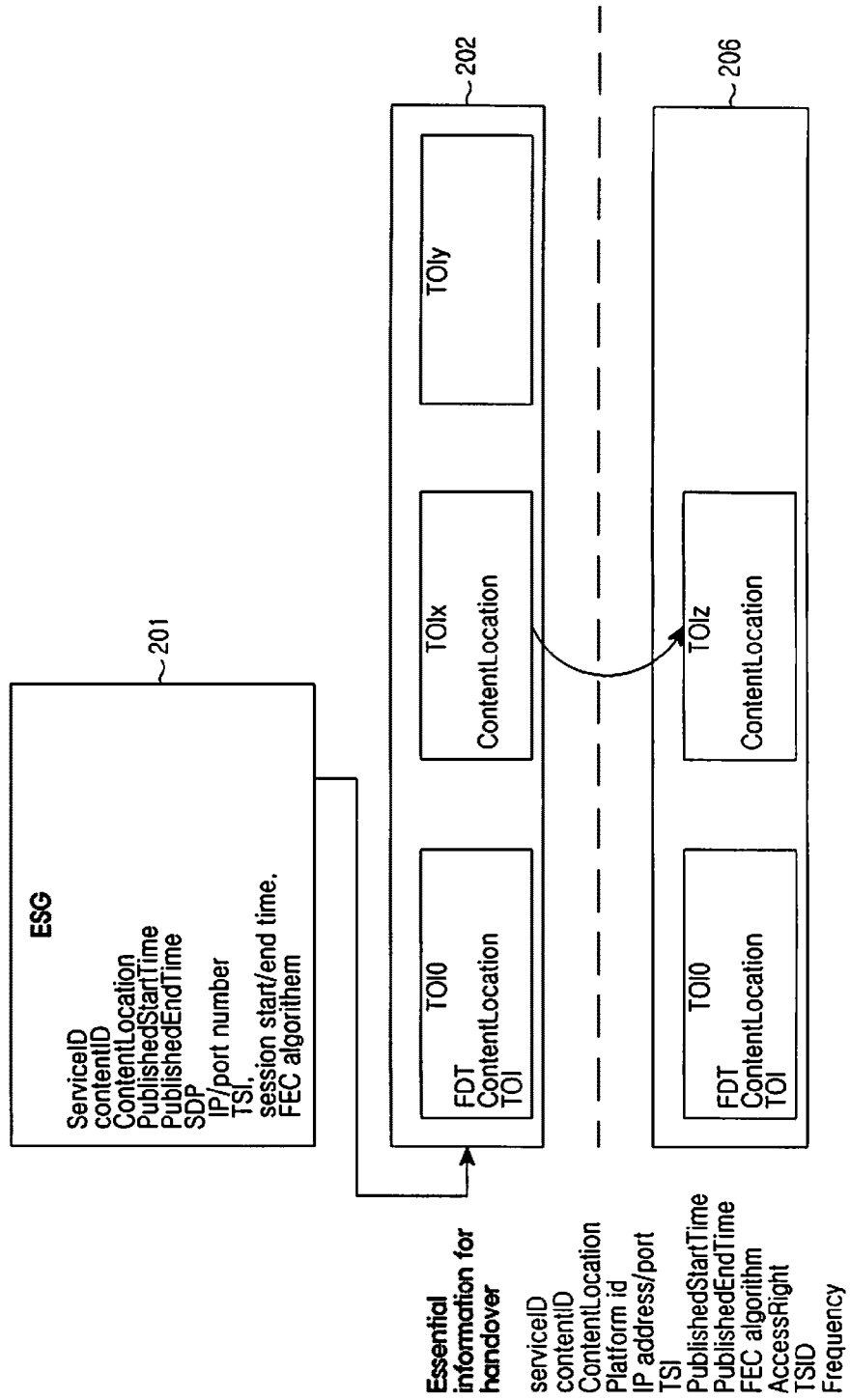
FIG. 2 is a diagram of a case 1 according to an embodiment of the present invention.

FIG. 2 illustrates Case 1 according to an embodiment of the present invention.

Referring to FIG. 2, Electronic Service Guide (ESG) information 201 and 202 are carried by a current TS and delivered to a terminal. 206 is carried by a new TS to which the terminal is to hand over. The file to be downloaded by the terminal is carried to the terminal by a Transport Object (TO). The TO is identified by a Transport Object Identifier (TOI). The 202 and the 206 denote TS each.

The TO is loaded on a File deLivery over Unidirectional Transport (FLUTE) session. The FLUTE session is distinguished by IP address/port and Transport Session Identifier (TSI). TOI 0 in the FLUTE session has one File Delivery Table (FDT). The FDT has a TOI list in relation to ContentLocation of the file and ContentLocation of the FLUTE session.

When the terminal wants to download the file, the essential information includes ServiceID, ContentLocation, platform id, IP address/port, TSI, Forward Error Correction (FEC)

algorithm, PublishedStartTime, PublishedEndTime, AccessRight, Transport Stream Identifier (TSID), and frequency. Herein, TSID and frequency are included to Program Specific Information/Service Information (PSI/SI), and the other information is included in the ESG.

When the terminal receives the ESG, the terminal can select the intended service based on ServiceID and contentID. The terminal can acquire the access time from PublishedStartTime and PublishedEndTime, acquire the location from ContentLocation, IP address/port, and TSI, and acquire the FEC algorithm and the access right from a Session Description Protocol (SDP).

Next, the terminal can determine the TS including the file to download and acquire the frequency from the PSI/SI. Thereafter, the terminal searches the FLUTE session.

The FDT in the TOI 0 is a list of ContentLocation and its related TOI values. The terminal searches the intended ContentLocation and examines the TOI value, and then starts the download of the file in the TO.

When the terminal hands over for the new TS, the essential information for downloading the past file (the file being downloaded) in the new TS includes ServiceID, contentID, ContentLocation, IP address/port, TSI, PublishedStartTime. PublishedEndTime, FEC algorithm, AccessRight, TSID, and Frequency.

The terminal can determine this information from the new ESG and PSI/SI in the new TS, which, however, still requires some time. However, in accordance with an embodiment of the present invention, a shortcut is provided to acquire the essential information and to continue the file download after the handover.

Case 2: a handover with respect to an interactive signal.

Figure 3:
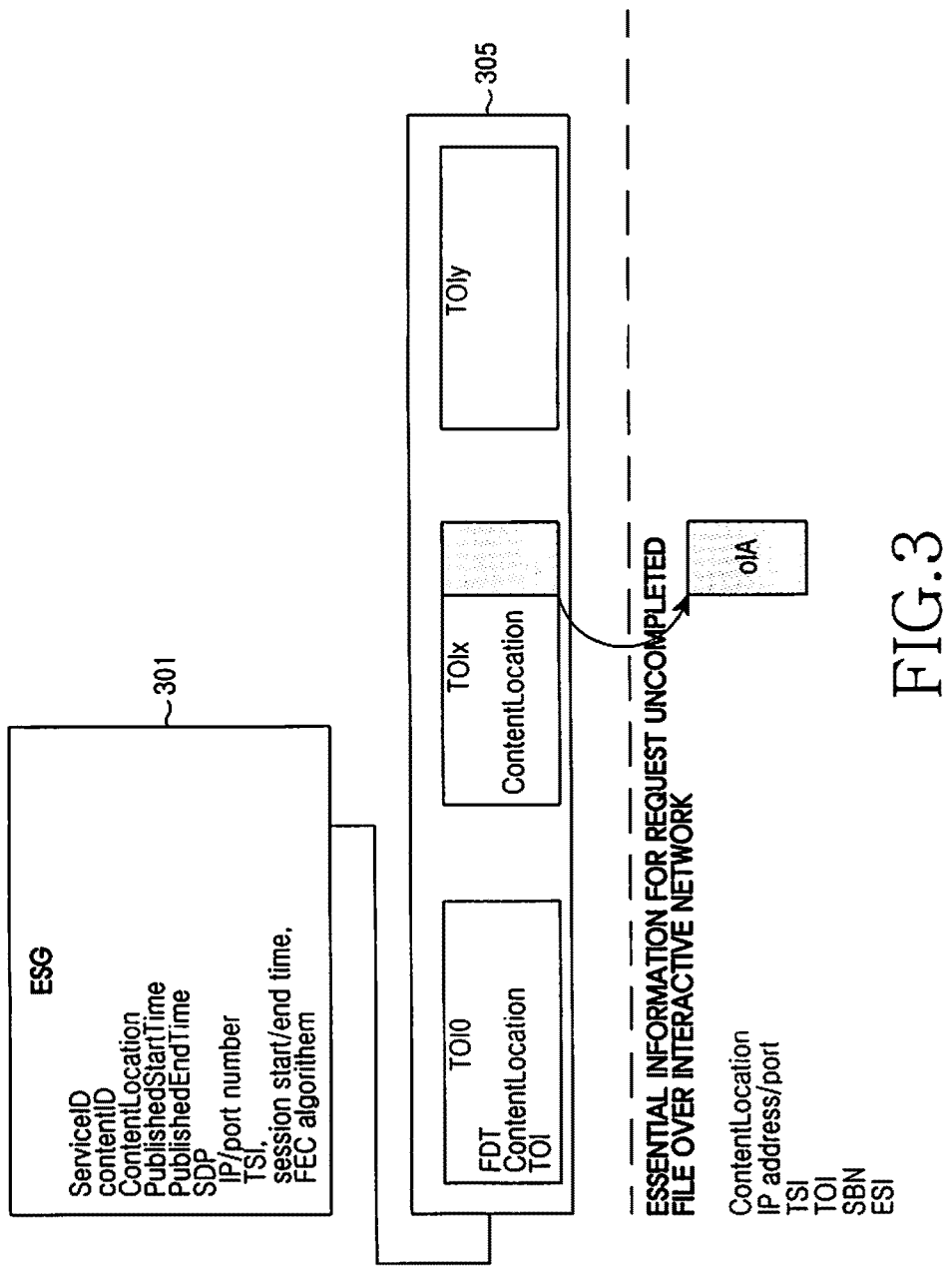
FIG. 3 is a diagram of a case 2 according to an embodiment of the present invention.

FIG. 3 illustrates Case 2 according to an embodiment of the present invention.

Referring to FIG. 3, while the terminal cannot complete the file download over the broadcast network, it can continue the download of the uncompleted part over an interactive network. ESG information 301 and 305 are delivered to the terminal through the current TS. The 305 denotes a TS.

The essential information for the terminal to request to download the uncompleted file Over the Interactive Network (OIA) includes ContentLocation, IP address/port, TSI, TOI, Secure Block Number (SBN), and Encoding Symbol Identifier (ESI). ServiceID and Content ID may be required.

As described above, to continue the download of the same file or the similar file after a handover, in accordance with an embodiment of the present invention, specific information is provided to the terminal in order for the terminal to keep downloading the file.

In the embodiments of the present invention, the location of the specific information varies. For example, the specific information can be provided in the ESG, a notification, independent signaling, the PSI/SI, etc. In this regard, several options shall be described below.

Solution 1: provide a new SDP including file download information at a new reception when a handover occurs.

Figure 4:
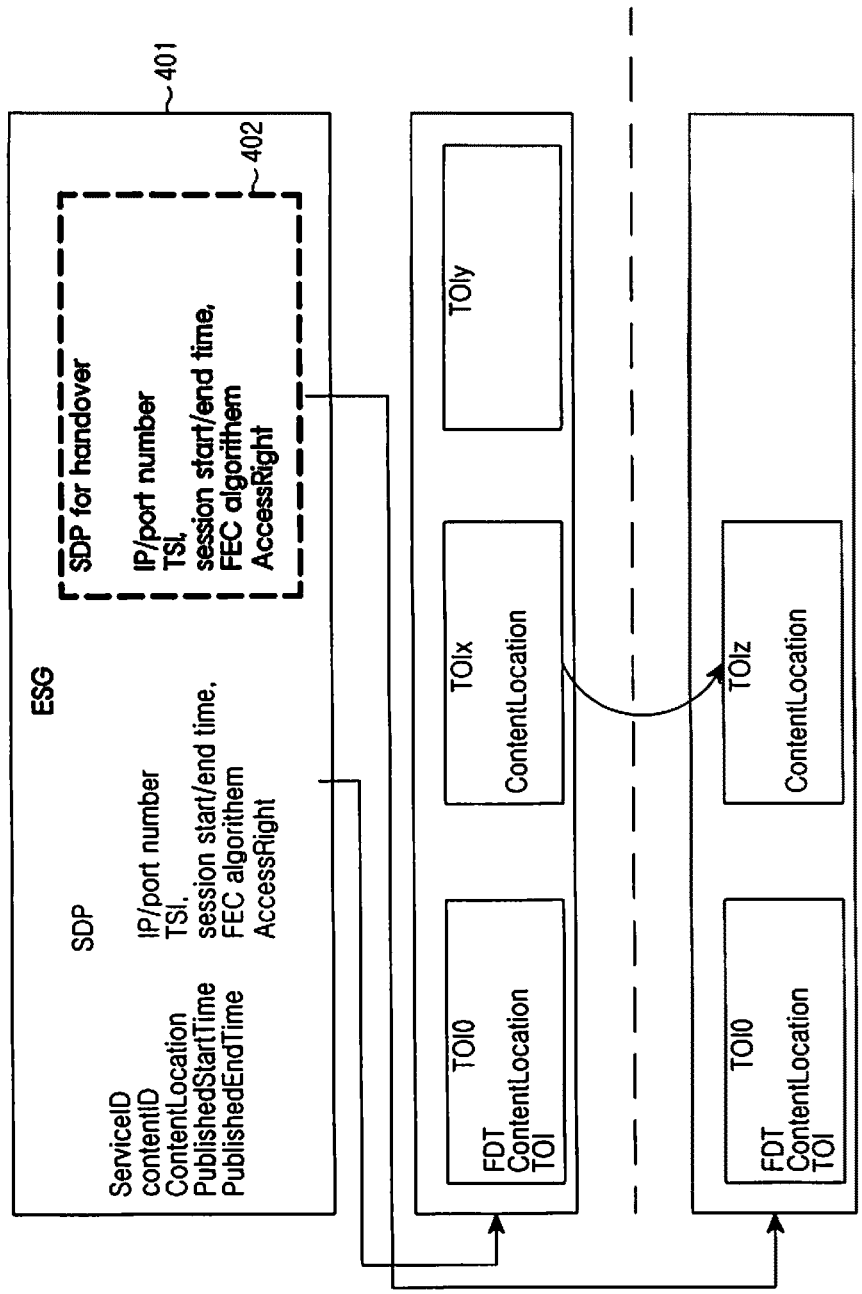
FIG. 4 is a diagram of a solution 1 according to an embodiment of the present invention.

FIG. 4 illustrates Solution 1 according to an embodiment of the present invention.

Referring to FIG. 4, a new SDP for the handover is added to the ESG 401. The added SDP for the handover as indicated by 402 is new SDP information signaled in the ESG.

The new SDP includes access information. The access information relates to the same or similar file with respect to another signal (for the handover).

The access information, for example, includes Platform id (not shown), IP address/pot, TSI, session start/endTime, access right, etc. The access information is not limited to these examples and can be any appropriate information. For example, the access information may include region information such as a network id, a cell id, a Mobile Country Code (MCC), and a Mobile Network Code (MNC). The region information, which is helpful to the file download, is signaled in the new SDP.

As indicated above, the location of the SDP for the handover can vary. For example, instead of being in the ESC, the SDP can be positioned in an acquisition fragment.

When the access information is included in the acquisition fragment, the bold letters in the acquisition fragment syntax of Table 1 below indicate the new SDP. The delivery of the new SDP to the terminal is similar to a conventional SDP delivery.

TABLE 1

```
<complexType name="AcquisitionType">
<sequence>
<element name="ComponentDescription" type="esg:ComponentDescriptionType"
maxOccurs="unbounded"/>
<element name="ZappingSupport" type="esg:ZappingSupportType" minOccurs="0"/>
<element name="KeyStream" type="esg:KeyStreamBaseType" minOccurs="0"
maxOccurs="unbounded"/>
</sequence>
<attribute name="contentMimeType" type="mpeg7:mimeType" use="required"/>
<attribute name="acquisitionID" type="anyURI" use="required"/>
</complexType>
<complexType name="ComponentDescriptionType">
<sequence>
<element name="ComponentCharacteristic" type="esg:ComponentCharacteristicType" minOccurs="0"
maxOccurs="unbounded"/>
<element name="SessionDescription" type="esg:SessionDescriptionBaseType"/>
<element name="HandoverSessionDescription" type="esg:SessionDescriptionBaseType"/>
</sequence>
</complexType>
```

As indicated above, the bold letters in Table 1 denote the new SDP that indicate the handover.

Semantics of the acquisition fragment syntax of Table 1 are shown in Table 2. The bold letters are the semantics of HandoverSessionDescription, which is the new SDP of the handover.

TABLE 2

| Field | Semantics |
|---|---|
| ComponentDescription | Describes a component of a service with respect to the characteristic of the component and the session in which the component is available. Note that an acquisition fragment can contain multiple ComponentDescriptions. For instance an indicated application can consume streaming components such as audio and video as well as download components such as interactive applications. In this case the streaming components are described by one ComponentDescription with a SessionDescription and two ComponentCharacteristic fields, one for audio and another one for video. A second ComponentDescription is instantiated for the download component describing the download session and the characteristic of the download components. |
| ComponentCharacteristic | Specifies the description of the component characteristic specific to the instance accessible by the instantiated acquisition information. |
| SessionDescription | Contains inlined SDP file which either directly describes the content session or the session carrying an SDP file that describes the content session. |
| HandoverSessionDescription | Contains inlined SDP file for handover which either directly describes the content session or the session carrying an SDP file that describes the content session. This SDP file includes the access information of the same/similar file in another reception when handover happens. |
| ZappingSupport | If specified indicates that zapping support of a specified Type is available for the acquisition described in the Acquisition Fragment. The field provides a specification of the type of zapping support and a reference to the session description (see section 5.10.5). |
| KeyStream | Signals all available key streams for a given Acquisition Fragment required for decryption as described in section 5.10.6. The mapping of key streams to media streams is described in [5]. |
| acquisitionID | Specifies a unique identifier of the instantiated Acquisition Fragment. For the scope of uniqueness see the semantics of serviceID in section 5.4.2. |
| contentMimeType | Specifies the content type from which the terminal can determine the consuming application of the service. |

As indicated above, the bold letters in Table 2 are the semantics of HandoverSessionDescription, which is the new SDP of the handover, and indicate access information for continuing the file downloading after the handover occurs.

Solution 2: provide a new ESG data model including a new fragment HandoverForFiledownload.

Figure 5:
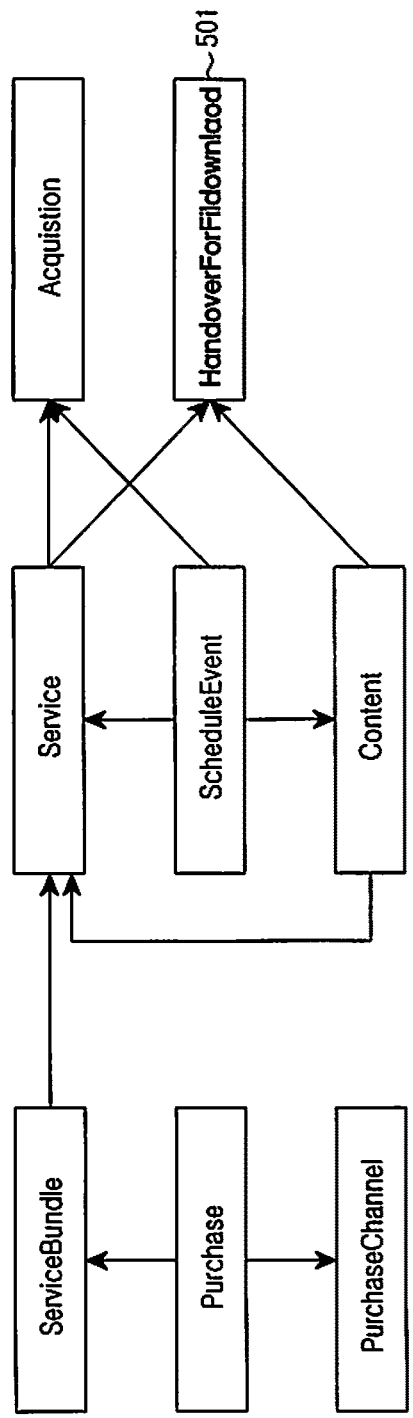
FIG. 5 is a diagram of a solution 2 according to an embodiment of the present invention.

FIG. 5 illustrates Solution 2 according to an embodiment of the present invention.

Referring to FIG. 5, an ESG data model is changed in that a new fragment HandoverForFiledownload 501 is added. The new fragment HandoverForFiledownload 501 indicates download information for receiving the same or similar file when the handover occurs in the other (new) reception. The fragment HandoverForFiledownload is shown in Table 3 below.

TABLE 3

```
<complexType name=" HandoverForFiledownload Type">
<sequence>
<element name="ServiceID" type="anyURI"/>
<element name="ContentID" type="anyURI"/>
<element name="ContentLocation" type="anyURI"/>
<element name="HOProviderURI" type="anyURI"/>
<element name="HOESGURI" type="anyURI"/>
<element name="HOServiceID" type="anyURI"/>
<element name="HOContentID" type="anyURI"/>
```

TABLE 3-continued

```
<element name="HOContentLocation" type="anyURI"/>
<element name="HOPlatformID" type="anyURI"/>
<element name="HOIPAddress" type="anyURI"/>
<element name="HOPort" type="anyURI"/>
<element name="HOTSI" type="anyURI"/>
<element name="HOTSID" type="anyURI"/>
<element name=" HOFrequency " type="anyURI"/>
<element name=" HOFECAlgorithm " type="anyURI"/>
<element name="HOPublishedStartTime" type="dateTime" minOccurs="0"/>
<element name="HOPublishedEndTime" type="dateTime" minOccurs="0"/>
<element name=" HOAccessRight " type="anyURI"/>
</sequence>
<attribute name="HandoverForFiledownloadID" type="anyURI" use="required"/>
</complexType>
```

Table 3 shows the HandoverForFiledownload fragment syntax. The HandoverForFiledownload fragment is shown below in Table 4.

TABLE 4

| Field | Semantics |
| --- | --- |
| ServiceID | Specifies the serviceID in the current reception. |
| ContentID | Specifies the ContentID in the current reception. |
| ContentLocation | Specifies the ContentLocation in the current reception. |
| HOProviderURI | Specifies the ESG Provider that the terminal could find the same/similar file. |
| HOESGURI | Specifies the ESG that the terminal could handover to and download the same/similar file. |
| HOServiceID | Specifies the serviceID in the new reception that the terminal could handover to. |
| HOContentID | Specifies the ContentID in the new reception that the terminal could handover to. |
| HOContentLocation | Specifics the CotentLocation in the new reception that the terminal could handover to. |
| HOPlatformID | Specifies the IP platform in the new reception that the terminal could handover to |
| HOIPAddress | Specifies the IP Address in the new reception that the terminal could handover to. |
| HOPort | Specifies the Port number in the new reception that the terminal could handover to. |
| HOTSI | Specifies the TSI of the file in the new reception. |
| HOTSID | Specifies TS ID that deliver this file in the new reception |
| HOFrequency | Specifies the frequency of this TS. |
| HOFECAlgorithm | Specifies the FEC algorithm of the file in the new reception. |
| HOPublishedStartTime | Specifies the start time of the file download in the new reception |
| HOPublishedEndTime | Specifies the end time of the file download in the new reception |
| HOAccessRight | Specifies the digital digest or digital signature of the file in the new reception. |
| HandoverForFiledownloadID | Specifies a unique identifier for the instantiated HandoverForFiledownload fragment. |

Table 4 shows the HandoverForFiledownload fragment semantics, and arranges download information for receiving the same or similar file when the terminal hands over to the new reception.

Solution 3: provide a new notification message relating to handover information transmitted from a server for file download.

An example of a format for a new notification message is shown in Table 5. The new notification message signals essential information for the file download of the new reception when the handover occurs.

TABLE 5

| Field | Semantics |
| --- | --- |
| NotificationType | Specifics this notification carries handover information for file download. |
| ESGURI | Specifies the ESG in the current reception. |
| ServiceID | Specifies the serviceID in the current reception. |
| ContentID | Specifies the ContentID in the current reception. |
| CotentLocation | Specifies the CotentLocation in the current reception. |
| HOProviderURI | Specifies the ESG Provider that the terminal could find the same/similar file |
| HOESGURI | Specifies the ESG that the terminal could handover to and download the same/similar file |
| HOServiceID | Specifies the serviceID in the new reception that the terminal could handover to. |
| HOContentID | Specifies the ContentID in the new reception that the terminal could handover to. |
| HOContentLocation | Specifies the ContentLocation in the new reception that the terminal could handover to. |
| HOPlatformID | Specifies the IP platform in the new reception that the terminal could handover to |
| HOIPAddress | Specifies the IPAddress in the new reception that the terminal could handover to. |
| HOPort | Specifies the Port number in the new reception that the terminal could handover to. |
| HOTSI | Specifies the TSI of the file in the new reception. |
| HOTSID | Specifies TS ID that deliver this file in the new reception |
| HOFrequency | Specifies the frequency of this TS. |
| HOFECAlgorithm | Specifies the FEC algorithm of the file in the new reception. |
| HOPublishedStartTime | Specifies the start time of the file download in the new reception |

Solution 4: provide a query message format in an InterActive (IA).

When a terminal hands over to an interactive network and wants to download a file over the interactive network, the terminal requests an uncompleted part from a server. An example of a query message format is shown in Table 6.

| Key | Value | Semantics |
| --- | --- | --- |
| Type | SB | The type of expected response: source block of the download file. |
| ProviderURI | URI of the ESG provider | Specifies the ESG Provider that the download file is described. |
| ESGURI | URI of the ESG | Identify the ESG that the download file is described |
| ServiceID | URI of the service | Identify the service including the download file |
| Contented | URI of the content | Identify the content including the download file |
| ContentLocation | URI of content location. | Identify the content location of the file that terminal expect to download |
| Platform id | ID of the platform | Identify the IP platform that the download file belongs to |
| IP | IP address | Identify the IP address of the file that the terminal expect to download |
| Port | port number of the file | Identify the port number of the file that the terminal expect to download |
| TSI | Transport session identifier | Identify the transport session of the file that the terminal expects to download. |
| TOI_start | Transport object identifier for the start point | Identify the transport object of the file that the terminal expect to start download |
| SBN_start | Source block number for the start point | Specifies from which source block number that terminal expect to start download over IA |
| ESI_start | Encoding symbol identifier for the start point | Specifies from which encoding symbol that the terminal expects to start download over IA. |
| TOI_End | Transport object identifier for the end point | Identify the transport object of the file that the terminal expect to end download<br>Note: the file download end point could be optional in the query message. If the query message does not include the end point, the server will send the whole uncompleted file to the terminal. If the query message has both start point and end point, the server will deliver the file between start point and end point to the terminal. |
| SBN_End | Source block number for the end point | Specifies from which source block number that terminal expect to end download over IA |
| ESI_End | Encoding symbol identifier for the end point | Specifies from which encoding symbol that the terminal expects to end download over IA. |

The query message can be signaled by an acquisition fragment of the ESG.

Figure 6:
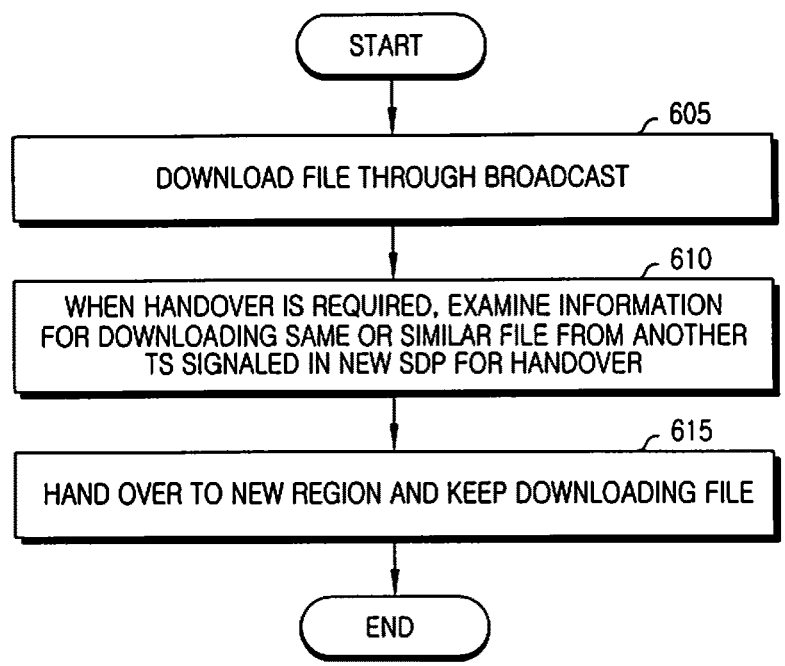
FIG. 6 is a flowchart illustrating an operation of a terminal for solution 1 according to an embodiment of the present invention.

FIG. 6 is a flowchart illustrating an operation of a terminal for Solution 1 according to an embodiment of the present invention.

Referring to FIG. 6, to download a file in a current reception, the terminal may require the handover in step 605.

The terminal receives the new SDP signaled in the current TS, and identifies the file download information to use in the TS to which the terminal hands over in step 610. Therefore, the terminal hands over to the new TS and continues the file download in step 615.

Figure 7:
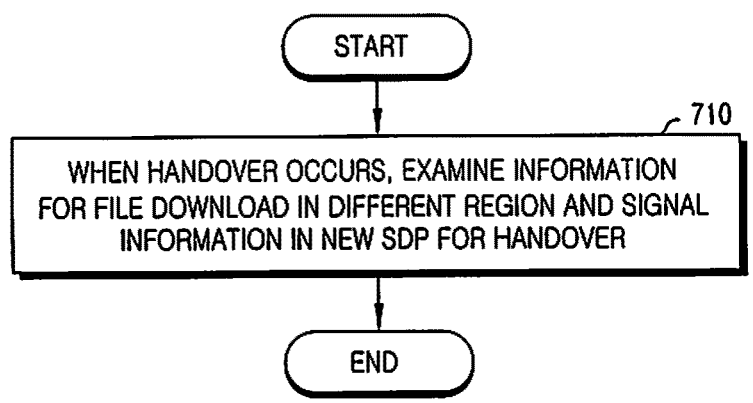
FIG. 7 is a flowchart illustrating an operation of a server for solution 1 according to an embodiment of the present invention.

FIG. 7 is a flowchart illustrating an operation of a server for Solution 1 according to an embodiment of the present invention.

Referring to FIG. 7, in step 710, for a handover, the server examines information of a file download at a different reception and signals the information of the file download to the terminal through a new SDP in step 710.

Figure 8:
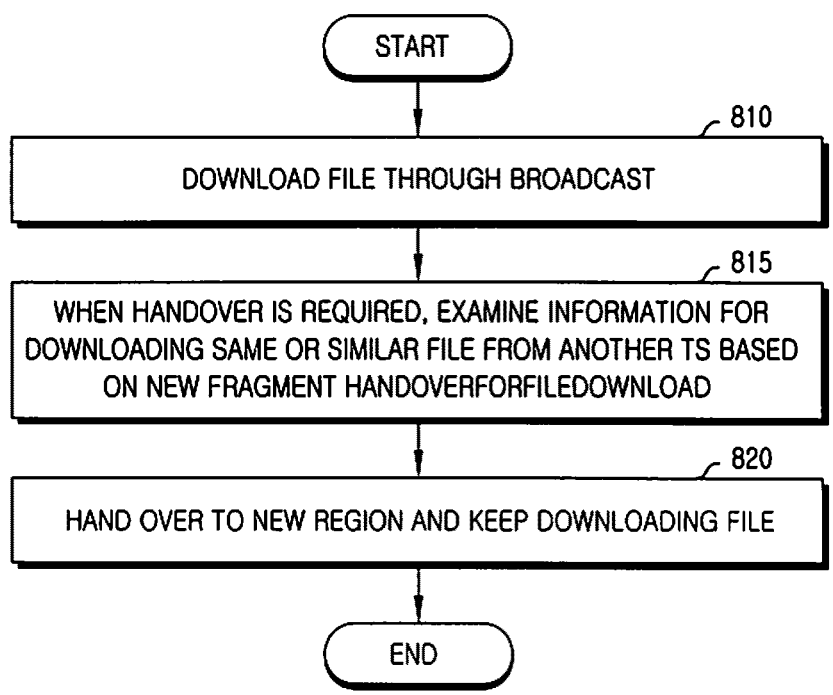
FIG. 8 is a flowchart illustrating an operation of a terminal for solution 2 according to an embodiment of the present invention.

FIG. 8 is a flowchart illustrating an operation of a terminal for Solution 2 according to an embodiment of the present invention.

Referring to FIG. 8, when downloading the file in the current reception in step 810, the terminal may require the handover. In step 815, the terminal identifies file download information based on the new fragment HandoverForFiledownload signaled in the current ESG, which is to be used in the new reception (or TS). In step 820, the terminal hands over to the new region and then continues downloading the current file.

Figure 9:
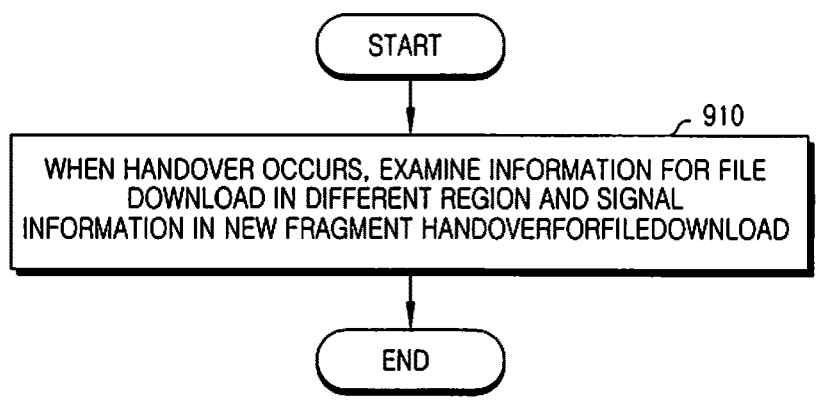
FIG. 9 is a flowchart illustrating an operation of a server for solution 2 according to an embodiment of the present invention.

FIG. 9 is a flowchart illustrating an operation of a server for Solution 2 according to an embodiment of the present invention.

Referring to FIG. 9, for the handover, the server examines information relating to a file download (required for a terminal to use after the handover) in a different reception and signals the information relating to the file download to the terminal through the new fragment HandoverForFiledownload in step 910.

Figure 10:
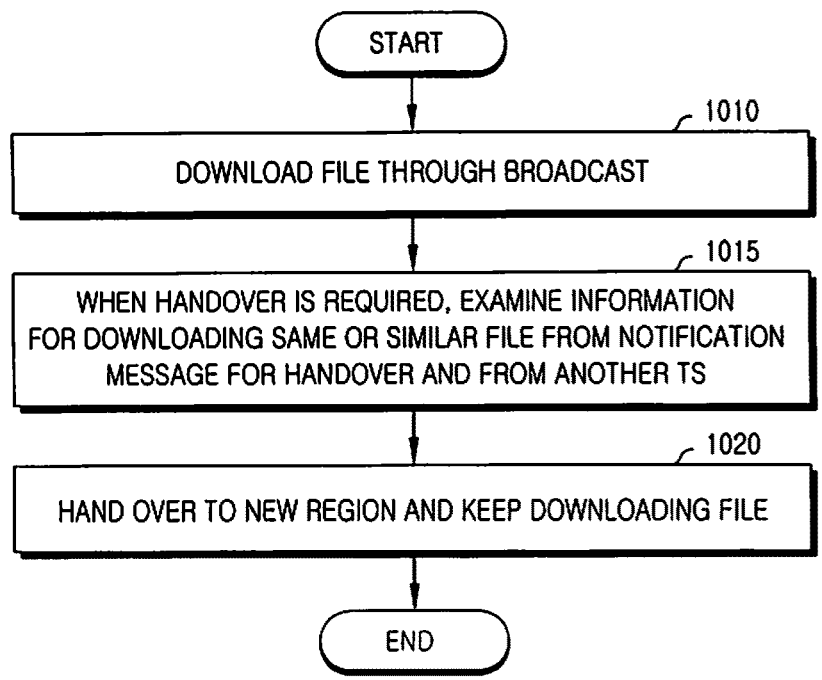
FIG. 10 is a flowchart illustrating an operation of a terminal for a solution 3 according to an embodiment of the present invention.

FIG. 10 is a flowchart illustrating an operation of a terminal for Solution 3 according to an embodiment of the present invention.

Referring to FIG. 10, to download the file in the current reception, the terminal can require the handover in step 1010. In step 1015, the terminal identifies file download information of a new reception (or TS) from a notification. In step 1020, the terminal hands over to the new TS and continues downloading the file.

Figure 11:
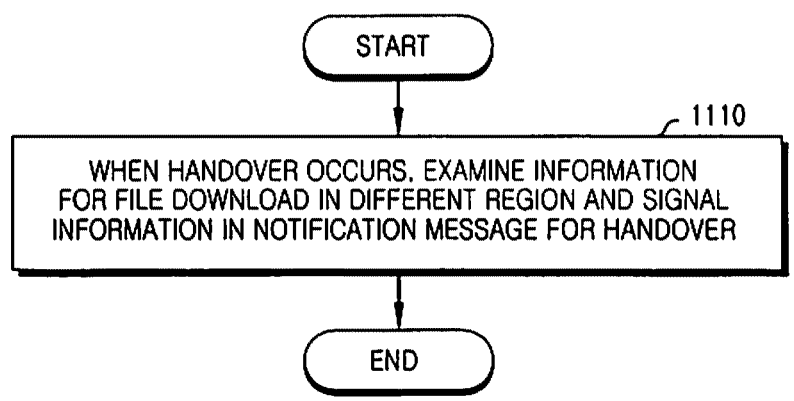
FIG. 11 is a flowchart illustrating an operation of a server for solution 3 according to an embodiment of the present invention.

FIG. 11 is a flowchart illustrating an operation of a server for Solution 3 according to an embodiment of the present invention.

Referring to FIG. 11, for a handover, the server examines information relating to a download of a file to be used by a terminal in a different reception and signals the information of the file download to the terminal through a notification message in step 1110.

Figure 12:
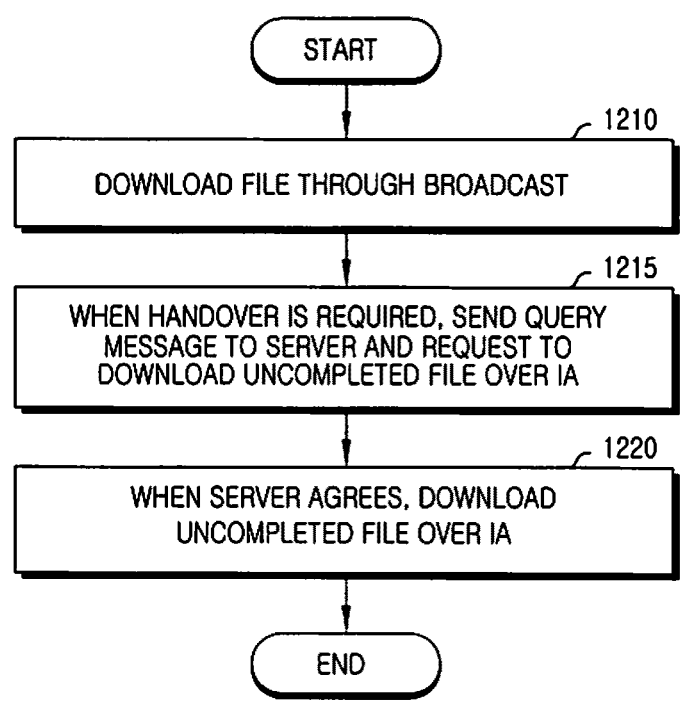
FIG. 12 is a flowchart illustrating an operation of a terminal for a solution 4 according to an embodiment of the present invention.

FIG. 12 is a flowchart illustrating an operation of a terminal for Solution 4 according to an embodiment of the present invention.

Referring to FIG. 12, to download a file in a current reception in step 1210, the terminal may need the handover. In this case, the terminal sends a query message to a server prior to the handover and requests to download an uncompleted file over an interactive network in step 1215. When the server grants the request, the terminal can begin to download the uncompleted file over the interactive network, after the handover, in step 1220.

Figure 13:
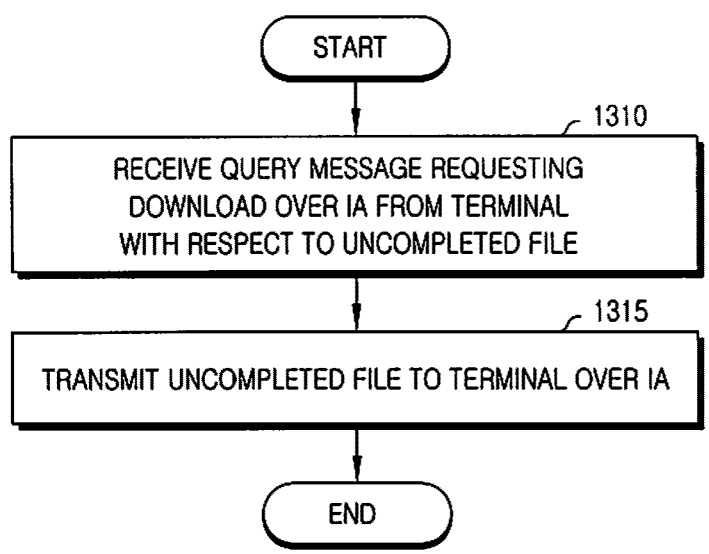
FIG. 13 is a flowchart illustrating an operation of a server for solution 4 according to an embodiment of the present invention.

FIG. 13 is a flowchart illustrating an operation of a server for Solution 4 according to an embodiment of the present invention.

Referring to FIG. 13, upon receiving from a query message relating to an uncompleted file from a terminal, which requests a download over an interactive network in step 1310, the server transmits the uncompleted file to the terminal over the interactive network in step 1315.

Figure 14:
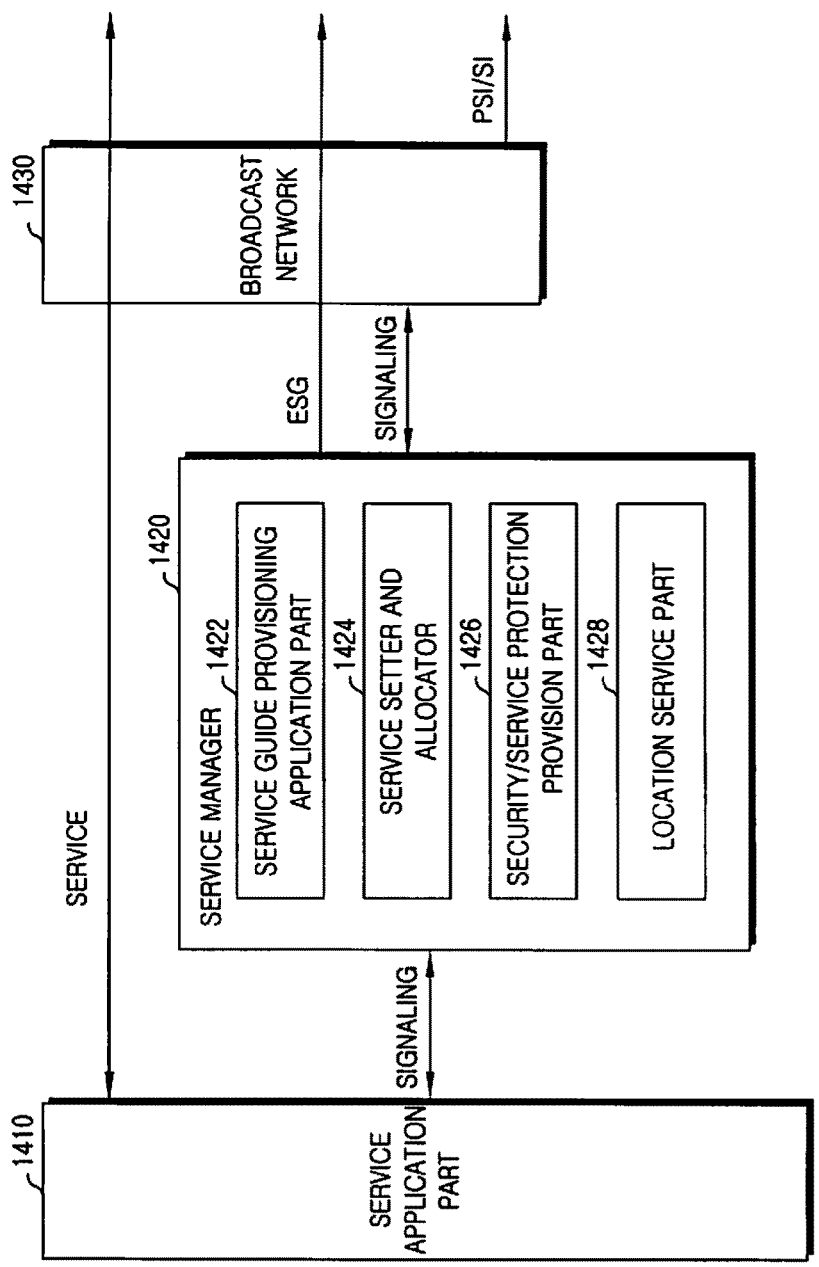
FIG. 14 is a block diagram illustrating a server according to an embodiment of the present invention.

FIG. 14 is a block diagram of a server according to an embodiment of the present invention.

Referring to FIG. 14, the server includes a service application part 1410 and a service manager 1420. The service application part 1410 aggregates content from various sources and their metadata to provide a service application. The service application part 1410 provides head-end application logic and provides the content encoded, to be read by the terminal, through streaming or file delivery.

The service application part 1410 generates service description metadata used in the ESG and interacts with the terminal for the service application. Also, the service application part 1410 conducts a service protection function. The service application part 1410 can be provided for each application offered by the IP datacast.

The service manager 1420 includes a service guide provisioning application part 1422, a service setter and allocator 1424, a security/service protection provision part 1426, and a location service part 1428. The service guide provisioning application part 1422 aggregates the ESGs, which are the metadata information, from the service applications. The service setter and allocator 1424 registers the service application that requests the bandwidth of the broadcasting. For example, the service setter and allocator 1424 registers a DVB-H IP platform of a DVB transport stream. Also, the service setter and allocator 1424 allocates the service based on a location, allocates bandwidth based on a time, and allocates a service schedule. The service setter and allocator 1424 manages sub-entities in relation to the broadcasting bandwidth contention.

The security/service protection provision part 1426 controls the access of the user to the service application. The location service part 1428 provides the interaction bearer network functionality or the location service including GPS service, as the service applications. The service application can be transmitted over a broadcast network 1430.

When a terminal hands over, the service manager 1420 transmits the aforementioned information to the terminal to continue the file download and expedite the file download.

Alternatively, the service application part 1410 can perform the functions of the service manager 1420.

Figure 15:
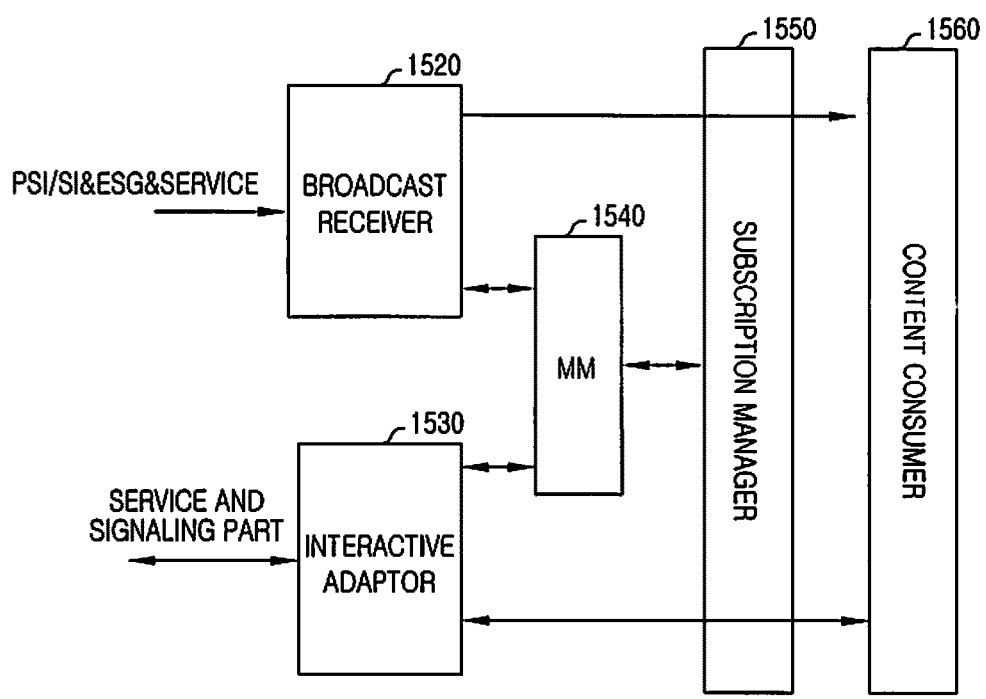
FIG. 15 is a block diagram of illustrating a terminal according to an embodiment of the present invention.

FIG. 15 is a block diagram of a terminal according to an embodiment of the present invention.

Referring to FIG. 15, the terminal includes a broadcast receiver 1520, an interactive adaptor 1530, a Mobility Manager (MM) 1540, a subscription manager 1550, and a content consumer 1560. The broadcast receiver 1520 receives the PSI/SI, the ESG, and the service application over the broadcast network. The interactive adaptor 1530 receives the service application over the interactive network or exchanges the signaling information with the server. The MM 1540 provides the mobile service to the terminal. Particularly, when the information for the file download in the handover is received from the server, the MM 1540 controls the broadcast receiver 1520 to promptly receive the broadcasting using the received information after the handover.

Further, the MM 1540 controls the terminal to receive the notification message from the server through the interactive adaptor 1530, to acquire the information for the file download in the handover from the notification message, and to promptly perform the broadcasting reception. The MM 1540 controls the interactive adaptor 1530 to send the query message and to request the information for the file download in the handover.

The subscription manager 1550 acquires the right for the service application, tracks the right determined by the terminal, and decodes the encoded service content. The content consumer 1560 consumes the content, i.e., reproduces the corresponding content.

When streaming, a terminal may change its reception source for a number of reasons. When handing over to the new content consumer 1560, the terminal requests to continuously receive the new or similar streaming. The present invention provides four solutions, when the terminal hands over to the new reception.

The first solution relates to a handover to a broadcast network. The second solution relates to a handover to an interactive network. The third solution relates to a handover to a network combining a broadcast network and an interactive network. The fourth solution downloads an unavailable streaming in advance and incorporates with an available streaming in a new TS.

Each individual solution requires essential information to support continuous download of the same or similar streaming, which is explained below.

Solution 1: where the terminal hands over to another broadcast TS.

Figure 16:
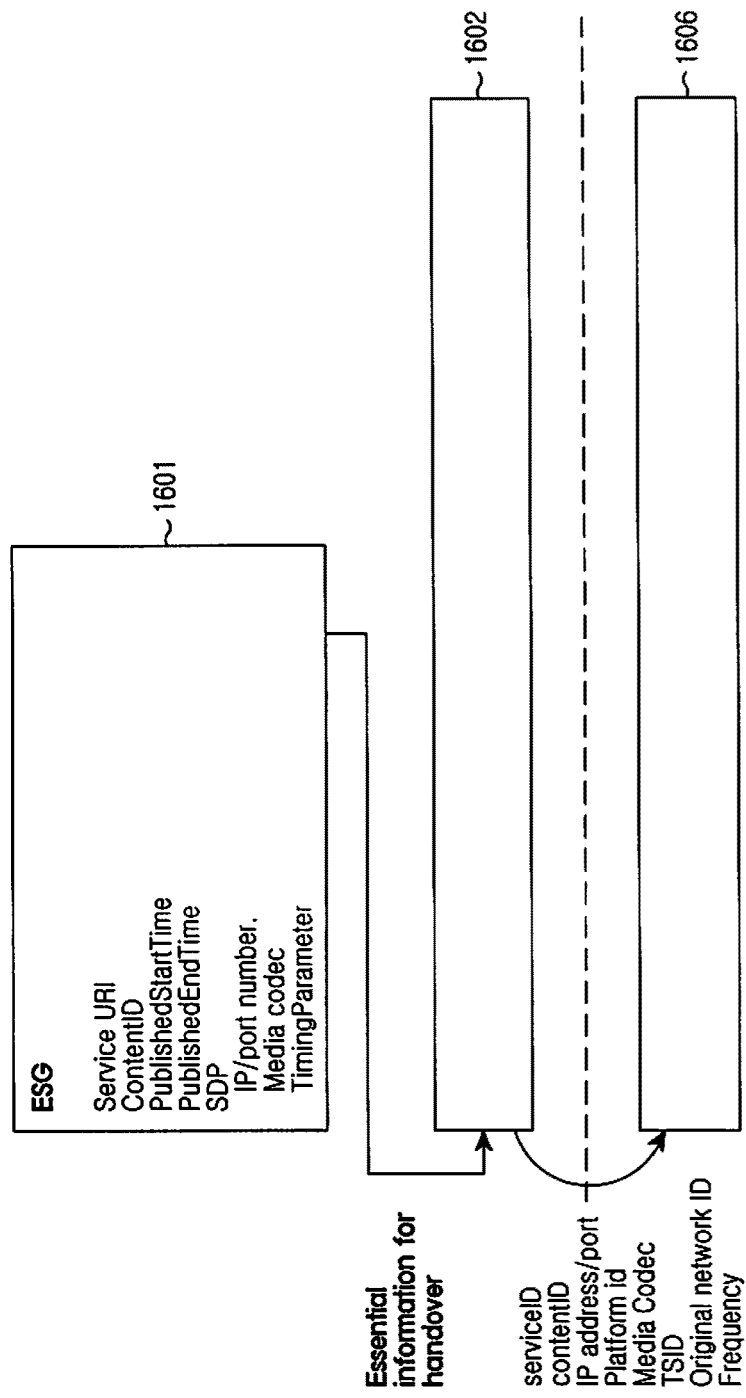
FIG. 16 is a diagram illustrating a streaming solution 1 according to an embodiment of the present invention.

FIG. 16 illustrates streaming Solution 1 according to an embodiment of the present invention.

Referring to FIG. 16, ESG 1601 and 1602 are carried by a current TS to the terminal. 1606 is included in the new TS to which the terminal is to hand over. The streamings in the TS are identified by a serviceID, a contentID, and an IP address/port number. The 1602 and the 1606 denote TS each.

Herein, the TS is identified by a TSID and an original network ID. The IP address is unique in one IP platform, which is identified with Platform id. When a Platform id is not unique, the IP platform is distinguished by the Platform id and the network ID.

When receiving the ESG 1601, the terminal selects its desired service based on the ServiceID and the ContentID. The terminal acquires the access time from the PublishedStartTime and the PublishedEndTime. The terminal acquires a location from the IP address/port and media codec of the SDP. Next, the terminal finds the TS including the streaming and acquires the frequency from the PSI/SI.

When the terminal hands over to the new broadcast TS, the essential information for identifying the past streaming in the new TS includes a ServiceID, a ContentID, an IP address/port, a platform id, a PublishedStartTime, a PublishedEndTime, a media codec, a TSID, an Original network id, and a frequency.

The terminal can determine the essential information from the new ESG and the PSI/SI in the new TS. However, this requires quite some time. Therefore, in accordance with an embodiment of the present invention, a shortcut is provided for acquiring the essential information and for continuing to receive the streaming service after the handover.

Solution 2: where a terminal hands over to an interactive network.

Figure 17:
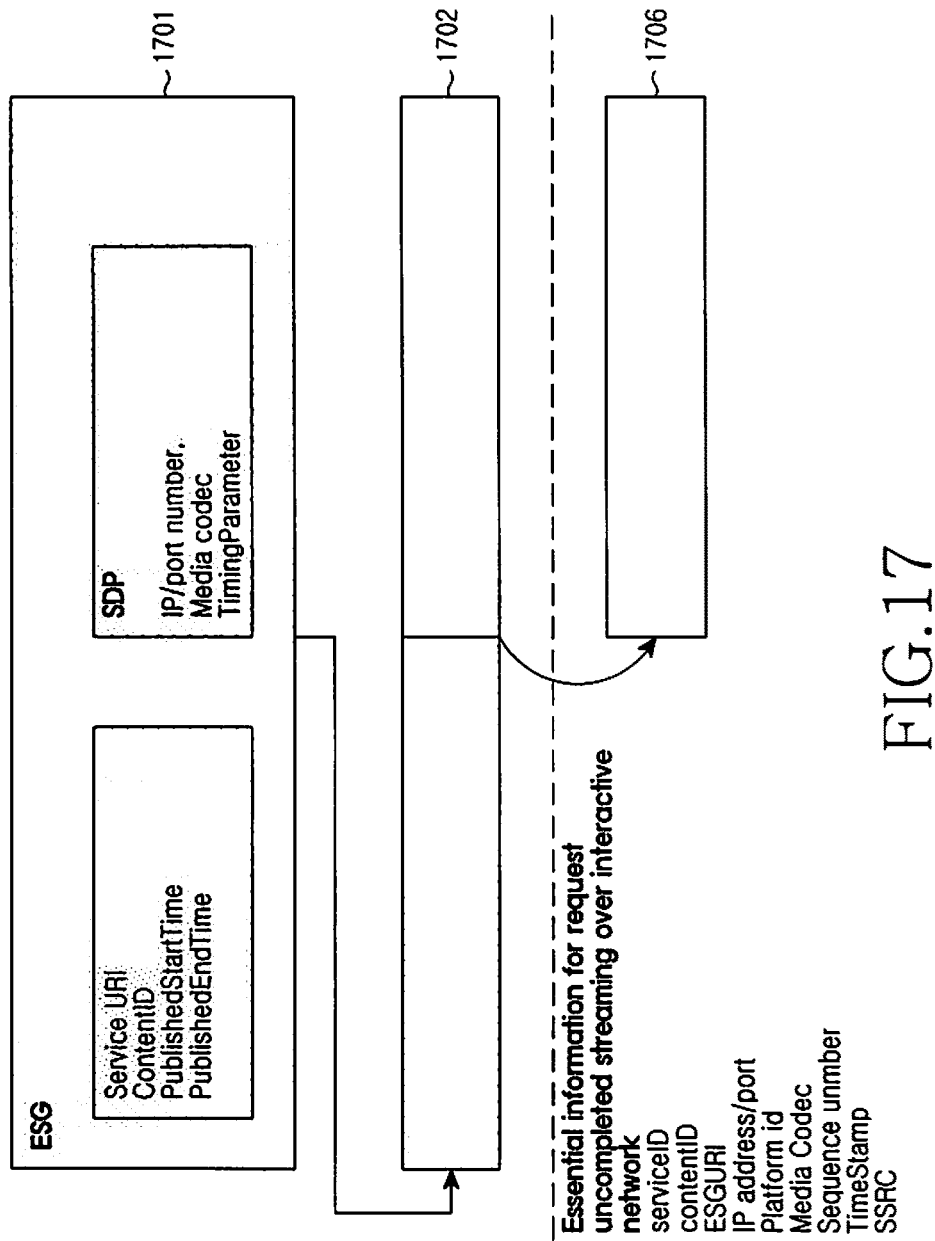
FIG. 17 is a diagram illustrating a streaming solution 2 according to an embodiment of the present invention.

FIG. 17 illustrates streaming Solution 2 according to an embodiment of the present invention.

Referring to FIG. 17, although the terminal cannot complete the streaming in the broadcast network (1702 indicates the uncompleted part), it can continue the streaming of the uncompleted part 1706 over the interactive network.

The essential information for the terminal to request the uncompleted streaming Over Interactive Network (OIA) includes a serviceID, a contentID, an ESGURI field, an IP address/port, a platform id, a media codec, a sequence number, a Time stamp, and a Synchronization Source Identifier (SSRC). The essential information is contained in the SDP newly defined in the ESG 1701.

Solution 3: where a partial streaming of an interactive network is combined with a partial streaming of a broadcast network.

Figure 18:
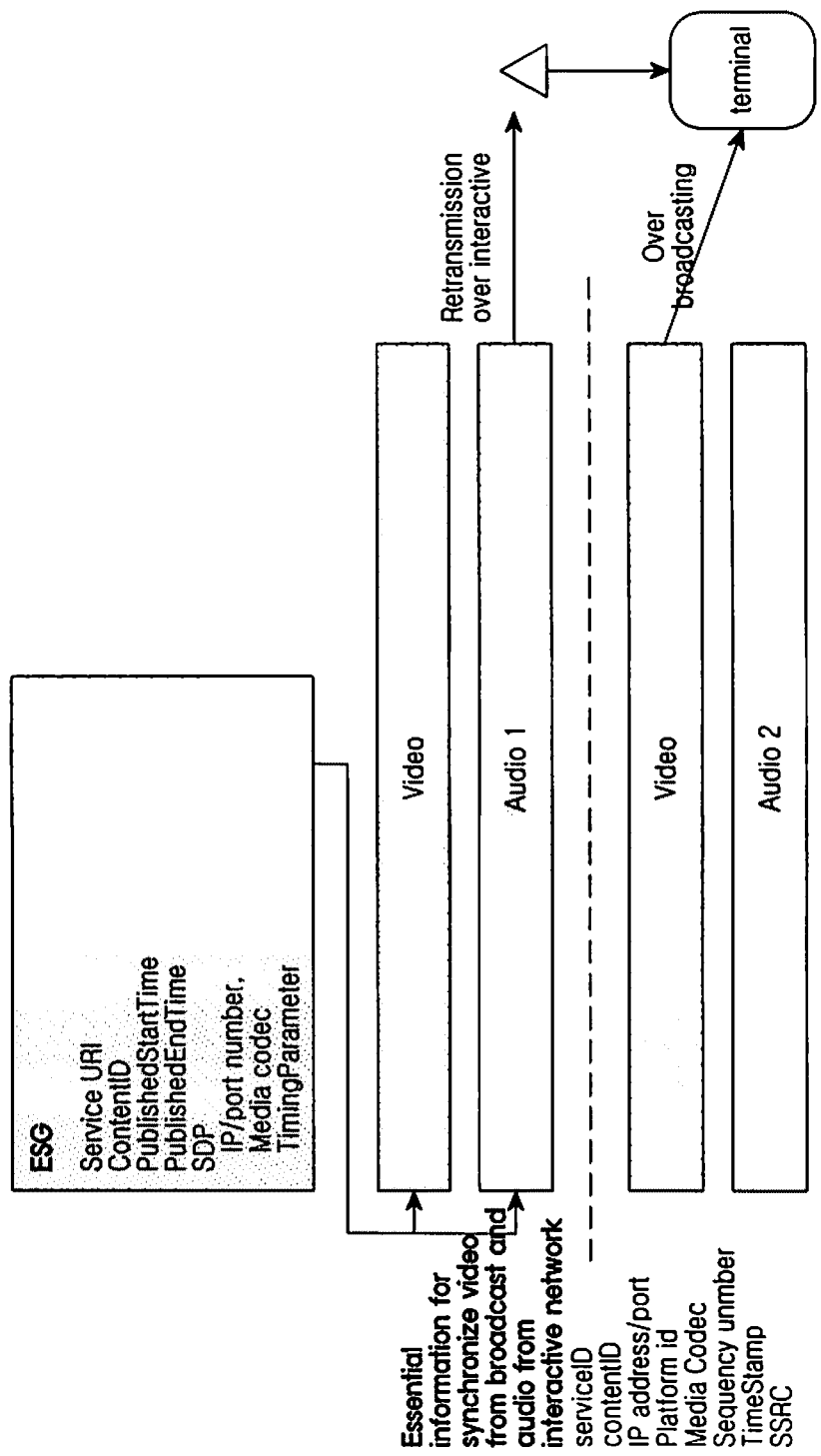
FIG. 18 is a diagram illustrating a streaming solution 3 according to an embodiment of the present invention.

FIG. 18 illustrates streaming Solution 3 according to an embodiment of the present invention.

Referring to FIG. 18, the new TS can carry the same video, whereas it can carry the difference audio for the previous TS.

advance and the terminal should download the audio in advance before the handover to the new TS.

After handing over to the new TS, the terminal can combine the video of the new TS and the audio downloaded from the previous TS, which can be used for dramas and educational programs.

The essential information includes information relating to a streaming that is downloaded (serviceID, contentID, and IP address/port of the streaming), information indicative of the file location (IP address/port, TSI, contentLocation, and TOI of file including the streaming), a start sequence number relating to the streaming in the download file and its related time stamp, an end sequence number relating to the streaming in the download file and its related time stamp, and a PublishedStartTime and a PublishedEndTime of the file.

As described above, the streaming handover type may be signaled in a number of locations, e.g., in the ESG, or through acquisition fragment, service fragment, content fragment, new fragment, and notification.

TABLE 7

```
<ClassificationScheme uri="urn:dvb:ipdc:esg:cs:StreamingHOTypeCS">
<Term termID="1">
<Name xml:lang="en">StreamingHO</Name>
<Definition xml:lang="en">Streaming handover </Definition>
<Term termID="1.1">
<Name xml:lang="en">StreamingoBC</Name>
<Definition xml:lang="en"> streaming handover over broadcast channel </Definition>
</Term>
<Term termID="1.2">
<Name xml:lang="en">StreamingoIA</Name>
<Definition xml:lang="en"> streaming handover over interactive channel</Definition>
</Term>
<Term termID="1.3">
<Name xml:lang="en">obothBCandIA</Name>
<Definition xml:lang="en">streaming handover over both broadcast and interactive channel</Definition>
</Term>
<Term termID="1.4">
<Name xml:lang="en">StreamingDownload</Name>
<Definition xml:lang="en">handover with download streaming and streaming
in the new signaling</Definition>
</Term>
</Term>
</ClassificationScheme>
```

In this situation, the terminal can receive the video from the new TS and request the past audio in the interactive channel. The terminal combines the video and the audio and receives the service as before.

The essential information for the terminal to request the unavailable streaming from the new TS includes a serviceID, a contentID, an ESGURI field, an IP address/port, a platform id, a media codec, a sequence number, a Time stamp, and a synchronization source identifier SSRC.

When there is a time difference between the previous streaming and the new streaming, the terminal determines the time difference and requests the streaming having the right sequence number and the time stamp using the time difference.

Solution 4: where an unavailable streaming is downloaded in advance.

Figure 19:
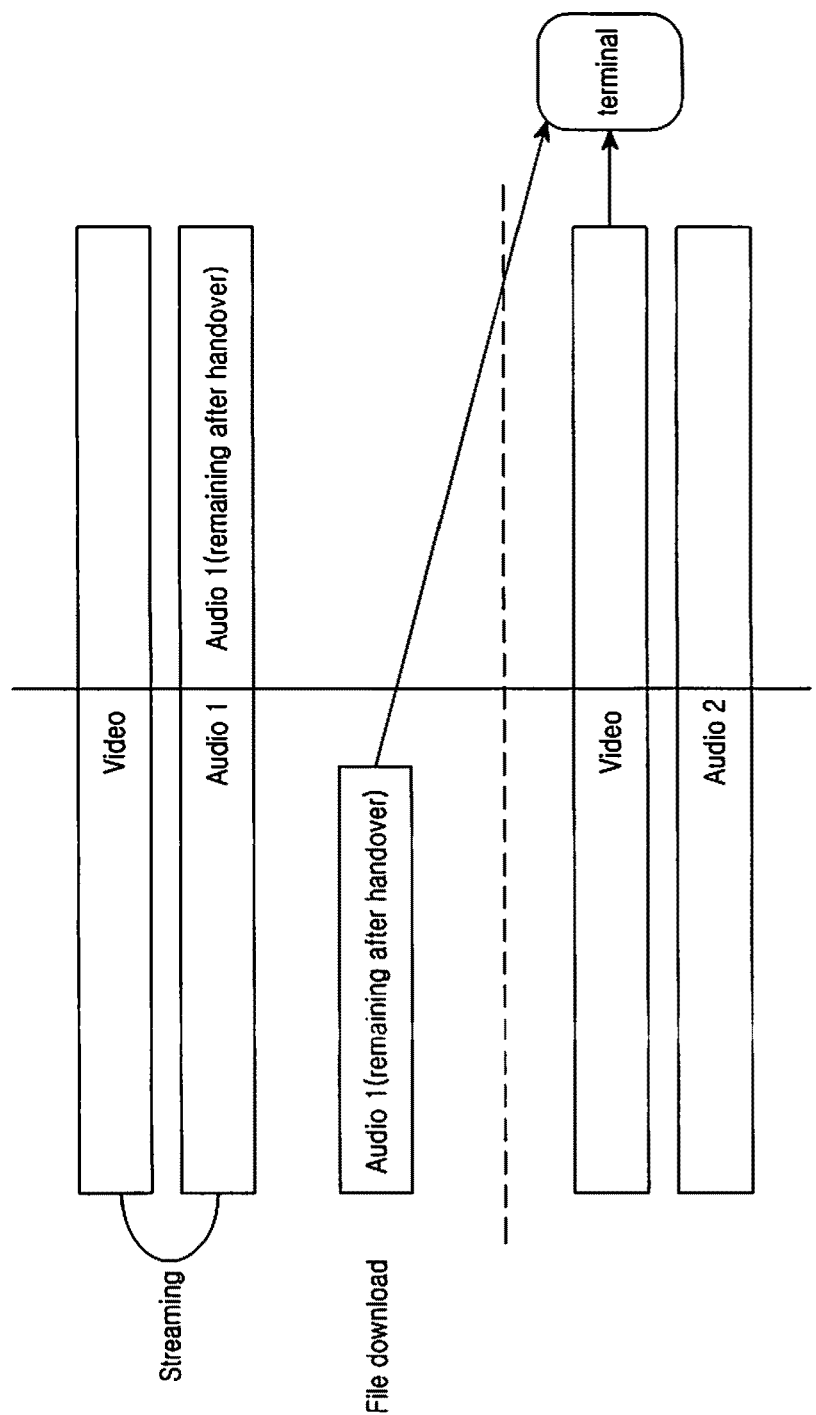
FIG. 19 is a diagram illustrating a solution 4 according to an embodiment of the present invention.

FIG. 19 illustrates Solution 4 according to an embodiment or the present invention.

Referring to FIG. 19, the new TS can carry the same video, whereas it can carry the different audio for the past TS. Yet, the terminal may still want the same video and audio.

Accordingly, in accordance with an embodiment of the present invention, the server should transmit the audio in In Table 7, TermID 1.1 is mapped to the streaming Solution 1, which indicates the streaming handover to another broadcast TS.

TermID 1.2 is mapped to the streaming Solution 2, which indicates the streaming handover to the interactive network.

TermID 1.3 is mapped to the streaming Solution 3, which indicates the handover incorporating the streaming over the broadcast TS and the streaming over the interactive network.

TermID 1.4 is mapped to the streaming Solution 4, which indicates the handover downloading the streaming in advance and incorporating the available streaming at the new reception.

The location of the essential information will now be explained herein below.

Streaming Location 1: When a handover occurs, a new SDP including streaming information of a new reception is provided.

Figure 20:
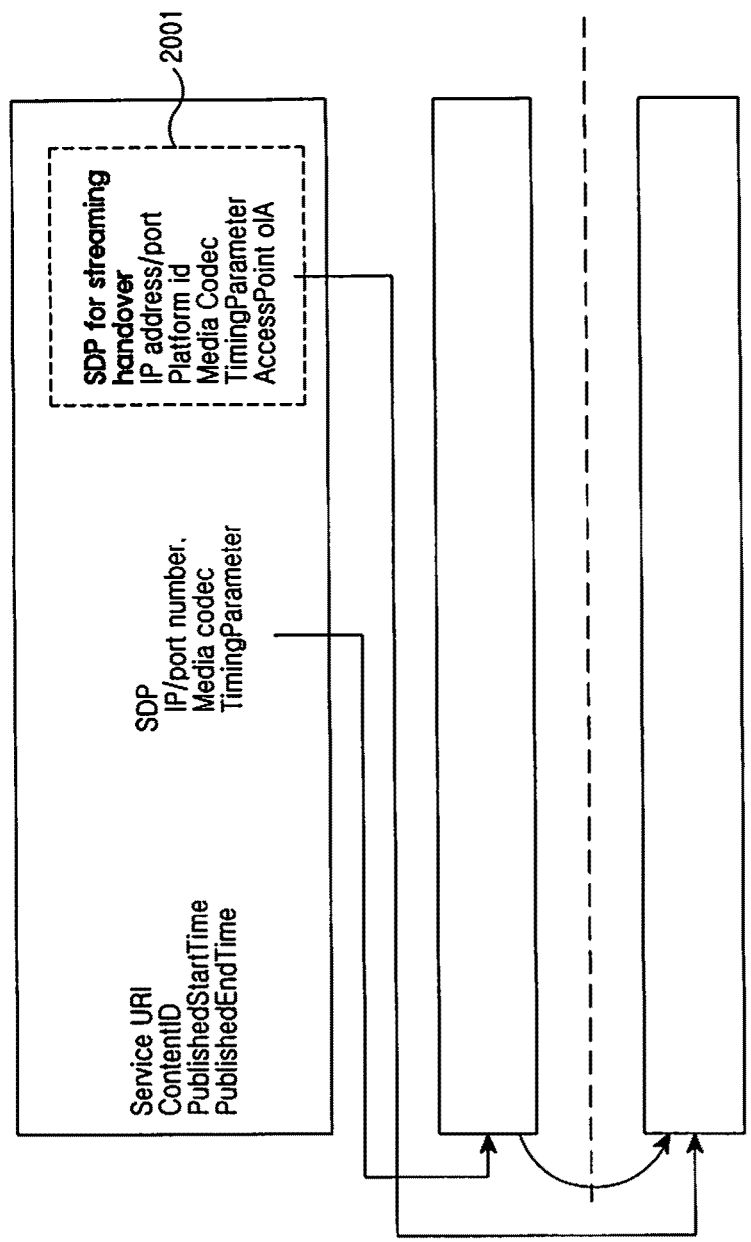
FIG. 20 is a diagram illustrating a Session Description Protocol (SDP) for a streaming handover according to an embodiment of the present invention.

FIG. 20 illustrates an SDP for a streaming handover according to an embodiment of the present invention.

Referring to FIG. 20, a new SDP 2001, which is included to the ESG, includes the streaming information, when the handover to a new reception source is carried out.

The new SDP 2001 includes access information of the same or similar streaming at the new reception source. The access information includes a Platform id, an IP address/port, a media codec, a time parameter, and an access point over IA.

However, the access information is not limited to this information, may include any other appropriate information (e.g., regional information such as network id, cell id, MCC, and MNC). Such information is helpful when the streaming is signaled in the new SDP.

The location of the SDP for the handover varies. For example, the SDP can be located in the acquisition fragment. When the SDP is signaled in the acquisition fragment, the bold letters in Table 8 indicate the new SDP. The delivery of the new SDP is similar to a conventional SDP delivery.

TABLE 8

```
<complexType name="AcquisitionType">
<sequence>
<element name="ComponentDescription" type="esg:ComponentDescriptionType" maxOccurs="unbounded"/>
<element name="ZappingSupport" type="esg:ZappingSupportType" minOccurs="0"/>
<element name="KeyStream" type="esg:KeyStreamBaseType" minOccurs="0" maxOccurs="unbounded"/>
</sequence>
<attribute name="contentMimeType" type="mpeg7:mimeType" use="required"/>
<attribute name="acquisitionID" type="anyURI" use="required"/>
</complexType>
<complexType name="ComponentDescriptionType">
<sequence>
<element name="ComponentCharacteristic" type="esg:ComponentCharacteristicType" minOccurs="0" maxOccurs="unbounded"/>
<element name="SessionDescription" type="esg:SessionDescriptionBaseType"/>
<element name="StreamingHandoverSessionDescription" type="esg:SessionDescriptionBaseType"/>
</sequence>
</complexType>
```

Table 8 shows the acquisition fragment syntax.

TABLE 9

| Field | Semantics |
|---|---|
| ComponentDescription | Describes a component of a service with respect to the characteristic of the component and the session in which the component is available.<br>Note that an acquisition fragment can contain multiple ComponentDescriptions. For instance an indicated application can consume streaming components such as audio and video as well as download components such as interactive applications. In this case the streaming components are described by one ComponentDescription with a SessionDescription and two ComponentCharacteristic fields, one for audio and another one for video. A second ComponentDescription is instantiated for the download component describing the download session and the characteristic of the download components. |
| ComponentCharacteristic | Specifies the description of the component characteristic specific to the instance accessible by the instantiated acquisition information. |
| SessionDescription | Contains inlined SDP file which either directly describes the content session or the session carrying an SDP file that describes the content session. |
| StreamingHandoverSessionDescription | Contains inlined SDP file for handover which either directly describes the content session or the session carrying an SDP file that describes the content session. This SDP file includes the access information of the same/similar streaming in another reception when handover happens. |
| ZappingSupport | If specified indicates that zapping support of a specified Type is available for the acquisition described in the Acquisition Fragment. The field provides a specification of the type of zapping support and a reference to the session description (see section 5.10.5). |
| KeyStream | Signals all available key streams for a given Acquisition Fragment required for decryption as described in section 5.10.6. The mapping of key streams to media streams is described in [5]. |
| acquisitionID | Specifies a unique identifier of the instantiated Acquisition Fragment. For the scope of uniqueness see the semantics of serviceID in section 5.4.2. |
| contentMimeType | Specifies the content type from which the terminal can determine the consuming application of the service. |

Table 9 arranges the acquisition fragment semantics.

Figure 21:
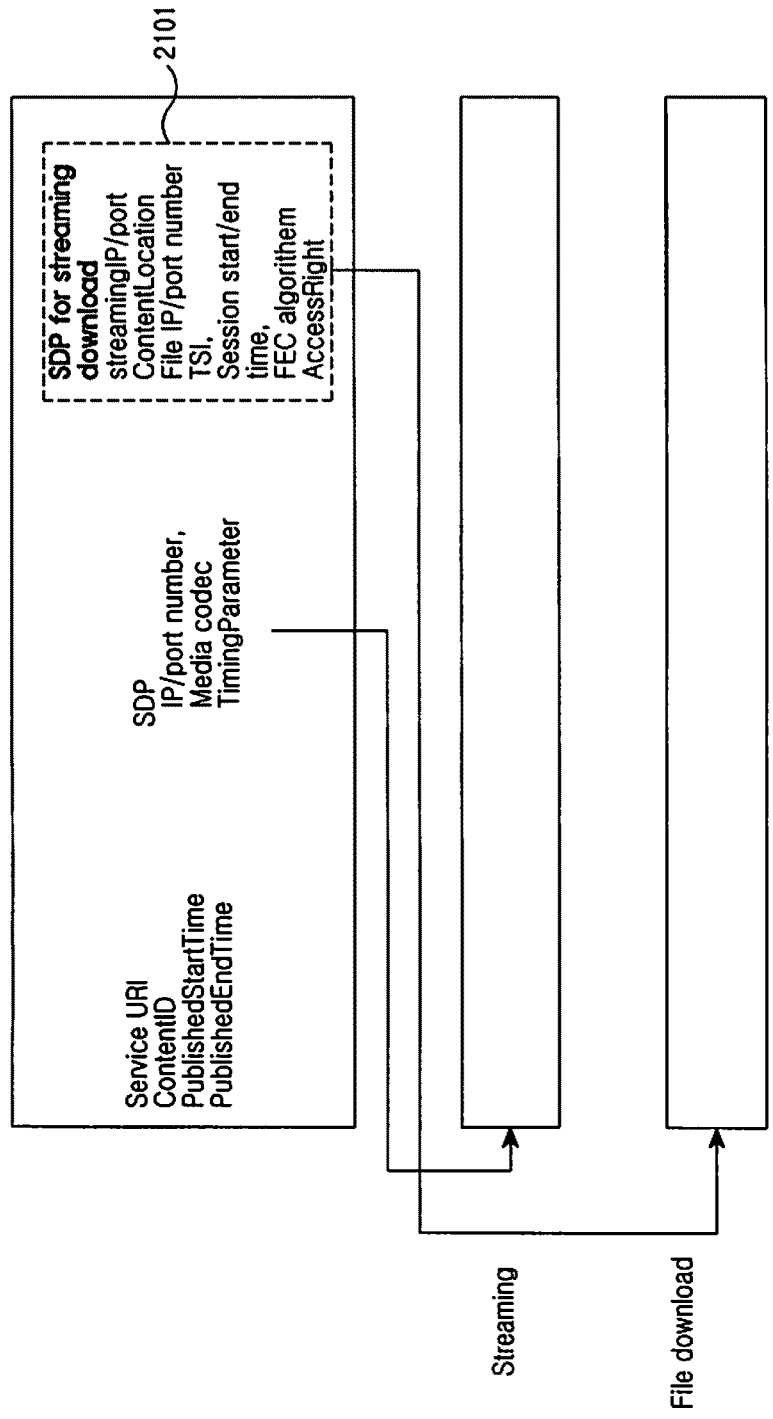
FIG. 21 is a diagram illustrating an SDP in a streaming download according to an embodiment of the present invention.

FIG. 21 illustrates an SDP in a streaming download according to an embodiment of the present invention.

Referring to FIG. 21, a new SDP 2101 includes the IP address for the streaming carried by the file. Download information for a file includes, for example, a ContentLocation, a Platform id, an IP address/port, a TSI, a session start/end time, an FEC algorithm an access right, etc.

The location of the SDP for the streaming download varies. For example, the SDP can be located in the acquisition fragment.

When the SDP is signaled in the acquisition fragment, Table 10 indicates the new SDP (the bold letters). The delivery of the new SDP is similar to a conventional SDP delivery.

TABLE 10

```
<complexType name="AcquisitionType">
<sequence>
<element name="ComponentDescription" type="esg:ComponentDescriptionType" maxOccurs="unbounded"/>
<element name="ZappingSupport" type="esg:ZappingSupportType" minOccurs="0"/>
<element name="KeyStream" type="esg:KeyStreamBaseType" minOccurs="0" maxOccurs="unbounded"/>
</sequence>
<attribute name="contentMimeType" type="mpeg7:mimeType" use="required"/>
<attribute name="acquisitionID" type="anyURI" use="required"/>
</complexType>
<complexType name="ComponentDescriptionType">
<sequence>
<element name="ComponentCharacteristic" type="esg:ComponentCharacteristicType" minOccurs="0" maxOccurs="unbounded"/>
<element name="SessionDescription" type="esg:SessionDescriptionBaseType"/>
<element name="StreamingDownloadSessionDescription" type="esg:SessionDescriptionBaseType"/>
</sequence>
</complexType>
```

Table 10 arranges the acquisition fragment syntax, which is described below in Table 11.

TABLE 11

| Field | Semantics |
|---|---|
| ComponentDescription | Describes a component of a service with respect to the characteristic of the component and the session in which the component is available.<br>Note that an acquisition fragment can contain multiple ComponentDescriptions. For instance an indicated application can consume streaming components such as audio and video as well as download components such as interactive applications. In this case the streaming components are described by one ComponentDescription with a SessionDescription and two ComponentCharacteristic fields, one for audio and another one for video. A second ComponentDescription is instantiated for the download component describing the download session and the characteristic of the download components. |
| ComponentCharacteristic | Specifies the description of the component characteristic specific to the instance accessible by the instantiated acquisition information. |
| SessionDescription | Contains inlined SDP file which either directly describes the content session or the session carrying an SDP file that describes the content session. |
| StreamingDownloadSessionDescription | Contains Inlined SOP file for handover which either directly describes the content session or the session carrying an SDP file that describes the content session. This SDP file includes the file download information of the streaming. |
| ZappingSupport | If specified indicates that zapping support of a specified Type is available for the acquisition described in the Acquisition Fragment. The field provides a specification of the type of zapping support and a reference to the session description (see section 5.10.5). |
| KeyStream | Signals all available key streams for a given Acquisition Fragment required for decryption as described in section 5.10.6. The mapping of key streams to media streams is described in [5]. |

TABLE 11-continued

| Field | Semantics |
| --- | --- |
| acquisitionID | Specifies a unique identifier of the instantiated Acquisition Fragment. For the scope of uniqueness see the semantics of serviceID in section 5.4.2. |
| contentMimeType | Specifies the content type from which the terminal can determine the consuming application of the service. |

Streaming location 2: A new ESG data model including a new fragment HandoverForStreaming is provided.

Figure 22:
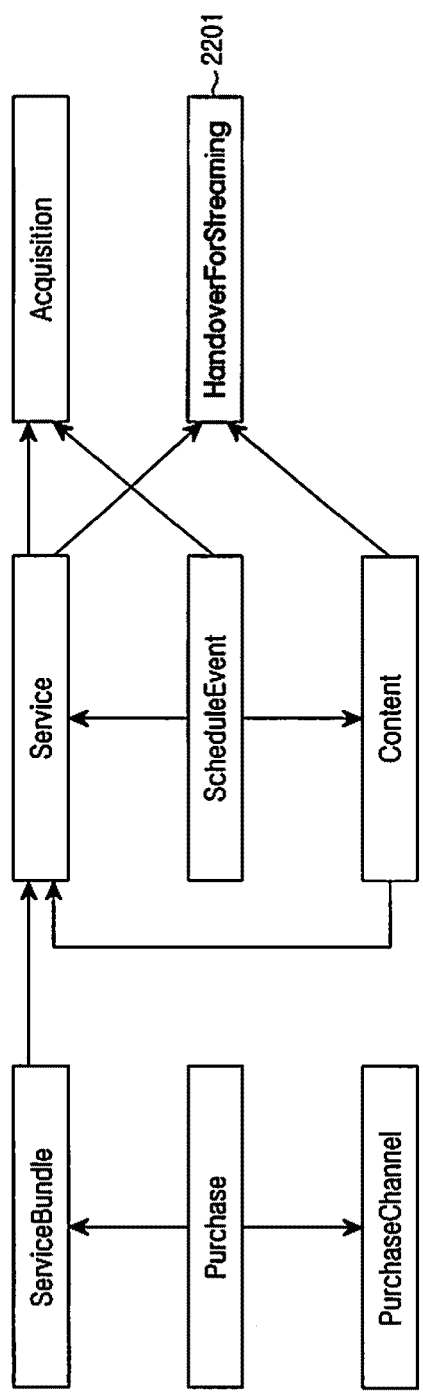
FIG. 22 is a diagram illustrating a new fragment HandoverForStreaming according to an embodiment of the present invention.

FIG. 22 illustrates a new fragment HandoverForStreaming according to an embodiment of the present invention.

Referring to FIG. 22, an ESG data model is changed and a new fragment HandoverForFiledownload 2201 is added. The new fragment HandoverForFiledownload 2201 indicates information relating to the same or similar streaming of another reception when the handover is performed.

Table 12 shows the HandoverForStreaming fragment syntax, which is described below in Table 13.

TABLE 12

```
<complexType name=" HandoverForStreamingType">
<sequence>
<element name="ServiceID" type="anyURI"/>
<element name="ContentID" type="anyURI"/>
<element name="StreamingHOType" type="tva:ControlledT
ermType" />
<element name="HOStreamingAccess" type=" HOStreamingAccessType" minOccurs="0"/>
<element name="HOStreamingDownload" type=" HOStreamingDownloadType" minOccurs="0"/>
<element name="HOStreamingoIA" type=" anyURI" minOccurs="0"/>
</sequence>
<attribute name="HandoverForStreamingID" type="anyURI" use="required"/>
</complexType>
<complexType name=" HOStreamingAccessType">
<sequence>
<element name="IPAddress" type="anyURI"/>
<element name="Port" type="anyURI"/>
<element name="HOProviderURI" type="anyURI"/>
<element name="HOESGURI" type="anyURI"/>
<element name="HOServiceID" type="anyURI"/>
<element name="HOContentID" type="anyURI"/>
<element name="HOPlatformID" type="anyURI"/>
<element name="HOIPAddress" type="anyURI"/>
<element name="HOPort" type="anyURI"/>
<element name="HOTSID" type="anyURI"/>
<element name="HOOriginalNetworkID" type="anyURI"/>
<element name=" HOFrequency " type="anyURI"/>
<element name=" HOMediaCodec " type="anyURI"/>
<element name="HOPublishedStartTime" type="dateTime" minOccurs="0"/>
<element name="HOPublishedEndTime" type="dateTime" minOccurs="0"/>
</sequence>
</complexType>
<complexType name=" HOStreamingDownloadType">
<sequence>
<element name="IPAddress" type="anyURI"/>
<element name="Port" type="anyURI"/>
<element name="HOESGURI" type="anyURI"/>
<element name="HOServiceID" type="anyURI"/>
<element name="HOContentID" type="anyURI"/>
<element name="HOContentLocation" type="anyURI"/>
<element name="HOPlatformID" type="anyURI"/>
<element name="HOIPAddress" type="anyURI"/>
<element name="HOPort" type="anyURI"/>
<element name="HOTSI" type="anyURI"/>
<element name="HOTSID" type="anyURI"/>
<element name="HOOriginalNetworkID" type="anyURI"/>
<element name=" HOFrequency " type="anyURI"/>
<element name=" HOFECAlgorithm " type="anyURI"/>
<element name="HOPublishedStartTime" type="dateTime" minOccurs="0"/>
<element name="HOPublishedEndTime" type="dateTime" minOccurs="0"/>
<element name=" HOAccessRight " type="anyURI"/>
</sequence>
</complexType>
```

TABLE 13

| Field | Semantics |
| --- | --- |
| ServiceID | Specifies the serviceID in the current reception. |
| ContentID | Specifies the ContentID in the current reception. |
| StreamingHOType | Specifies which kinds of the streaming handover type it is. The four kinds of types are described in section 2. |
| HOStreamingAccess | Specify the access information of the streaming in the new broadcast reception. |
| HOStreamingDownload | Specify the download information for the streaming if solution 4 is used. |
| HOStreamingoIA | Specify the access point to consume the streaming over interactive network |
| HandoverForFiledownloadID | Specifies a unique identifier for the instantiated HandoverForFiledownload fragment. |
| HOStreamingAccessType | This field specifies the access information of the streaming in the new broadcast reception. |
| IPAddress | Specifies the IP Address of the streaming in the current reception. |
| Port | Specifies the Port number of the streaming in the current reception. |
| HOProviderURI | Specifies the ESG Provider that has the same/similar streaming |
| HOESGURI | Specifies the ESG that has the same/similar streaming. |
| HOServiceID | Specifies the serviceID in the new reception that the terminal could handover to. |
| HOContentID | Specifies the ContentID in the new reception that the terminal could handover to. |
| HOPlatformID | Specifies the IP platform in the new reception that the terminal could handover to |
| HOIPAddress | Specifies the IPAddress in the new reception that the terminal could handover to. |
| HOPort | Specifies the Port number in the new reception that the terminal could handover to. |
| HOTSID | Specifies TS ID that deliver this streaming in the new reception |
| HOOrignalNetworkID | Specifies the original network id of the transport stream. |
| HOFrequency | Specifies the frequency of the TS that has the same/similar streaming. |
| HOMediaCodec | Specifies the Media codec of the streaming in the new reception. |
| HOPublishedStartTime | Specifies the start time of the streaming in the new reception |
| HOPublishedEndTime | Specifies the end time of the streaming in the new reception |
| HOStreamingDownloadType | This field specifies the download information of the file that includes the streaming. |
| IPAddress | Specifies the IPAddress of the streaming in the current reception. |
| Port | Specifies the Port number of the streaming in the current reception. |
| HOESGURI | Specifies the ESG that the terminal could handover for the same/similar streaming. |
| HOServiceID | Specifies the servicID in the new reception that the terminal could handover to. |
| HOContentID | Specifies the ContentID in the new reception that the terminal could handover to. |
| HOContentLocation | Specifies the ContentLocation of the file that including the streaming that the terminal could download in advance. |
| HOPlatformID | Specifies the IP platform for the file that including the streaming. |
| HOIPAddress | Specifies the IPAddress of the file that including the streaming. |
| HOPort | Specifies the Port number of the file that including the streaming.. |
| HOTSI | Specifies the TSI of the file that including the streaming in the new reception. |
| HOTSID | Specifies TS ID that deliver this file hat including the streaming |
| HOFrequency | Specifies the frequency of the TS carries the file. |
| HOFECAlgorithm | Specifies the FEC algorithm of the file. |
| HOPublishedStartTime | Specifies the start time of the file download |
| HOPublishedEndTime | Specifies the end time of the file download |
| HOAccessRight | Specifies the digital digest or digital signature of the file in the new reception. |

Table 13 arranges the HandoverForStreaming Fragment semantics.

Streaming Location 3: A new notification message for the handover information in the streaming.

The new notification message is defined, and the notification message is to signal essential information relating to the streaming in the new reception when the handover is performed. An example of the new notification message is shown below in Table 14.

TABLE 14

| Field | Semantics |
| --- | --- |
| NotificationType | Specifies this notification carries handover information for streaming. |
| ServiceID | Specifies the serviceID in the current reception. |
| ContentID | Specifies the ContentID in the current reception. |
| StreamingHOType | Specifies which kinds of the streaming handover type it is. The four kinds of types are described in section 2. |
| HOStreamingAccess | Specify the access information of the streaming in the new broadcast reception. |
| HOStreamingDownload | Specify the download information for the streaming if solution 4 is used. |
| HOStreamingoIA | Specify the access point to consume the streaming over interactive network |
| HandoverForFiledownloadID | Specifies a unique identifier for the instantiated HandoverForFiledownload fragment. |
| HOStreamingAccessType | This field specifies the access information of the streaming in the new broadcast reception. |
| IPAddress | Specifies the IPAddress of the streaming in the current reception. |
| Port | Specifies the Port number of the streaming in the current reception. |
| HOProviderURI | Specifies the ESG Provider that has the same/similar streaming. |
| HOESGURI | Specifies the ESG that has the same/similar streaming. |
| HOServiceID | Specifies the serviceID in the new reception that the terminal could handover to. |
| HOContentID | Specifies the ContentID in the new reception that the terminal could handover to. |
| HOPlatformID | Specifies the IP platform in the new reception that the terminal could handover to |
| HOIPAddress | Specifies the IPAddress in the new reception that the terminal could handover to. |
| HOPort | Specifies the Port number in the new reception that the terminal could handover to. |
| HOTSID | Specifies TS ID that deliver this streaming in the new reception |
| HOOrignalNetworkID | Specifies the original network id of the transport stream. |
| HOFrequency | Specifies the frequency of the TS that has the same/similar streaming. |
| HOMediaCodec | Specifies the Media codec of the streaming in the new reception. |
| HOPublishedStartTime | Specifies the start time of the streaming in the new reception |
| HOPublishedEndTime | Specifies the end time of the streaming in the new reception |
| HOStreamingDownloadType | This field specifies the download information of the file that includes the streaming. |
| IPAddress | Specifies the IPAddress of the streaming in the current reception. |
| Port | Specifies the Port number of the streaming in the current reception. |
| HOESGURI | Specifies the ESG that the terminal could handover for the same/similar streaming. |
| HOServiceID | Specifies the serviceID in the new reception that the terminal could handover to. |
| HOContentID | Specifies the ContentID in the new reception that the terminal could handover to. |
| HOContentLocation | Specifies the ContentLocation of the file that including the streaming that the terminal could download in advance. |
| HOPlatformID | Specifies the IP platform for the file that including the streaming. |
| HOIPAddress | Specifies the IP Address of the file that including the streaming. |
| HOPort | Specifies the Port number of the file that including the streaming.. |
| HOTSI | Specifies the TSI of the file that including the streaming in the new reception. |
| HOTSID | Specifies TS ID that deliver this file hat including the streaming |
| HOFrequency | Specifies the frequency of the TS carries the file. |
| HOFECAlgorithm | Specifies the FEC algorithm of the file. |
| HOPublishedStartTime | Specifies the start time of the file download |
| HOPublishedEndTime | Specifies the end time of the file download |
| HOAccessRight | Specifies the digital digest or digital signature of the file in the new reception. |

Streaming location 4: A new query message of the present invention requests the streaming and the access point over the interactive network.

When the terminal wants to hand over to the interactive network and to continue the streaming over the interactive network, it can request the uncompleted part to the server. An example of the query message format is shown below in Table 15.

TABLE 15

| Key | Value | Semantics |
| --- | --- | --- |
| Type | SB | The type of expected response: source block of the download file. |
| ProviderURI | URI of the ESG Provider | Identify the ESG Provider that the streaming is described |

TABLE 15-continued

| Key | Value | Semantics |
| --- | --- | --- |
| ESGURI | URI of the ESG | Identify the ESG that the streaming is described |
| ServiceID | URI of the service | Identify the service including the streaming |
| contentID | URI of the content | Identify the content including the streaming |
| Platform id | ID of the platform | Identify the IP platform that the streaming belongs to |
| IP | IP address | Identify the IP address of the streaming that the terminal expect to download |
| port | port number of the file | Identify the port number of the streaming that the terminal expect |
| SSRC | Synchronization source code | Identify the synchronization source code of the expected streaming |
| SequenceNumber_start | Sequence number for the start point | Identify the start sequence number of the streaming that the terminal wants to consume |
| TimeStamp_start | Time stamp for the start point | Specifies from which time stamp that terminal expect to start streaming over IA |
| SequenceNumber_end | Sequence number for the end point | Identify the end sequence number of the streaming that the terminal wants to stop<br>Note: the streaming end point could be optional in the query message. If the query message does not include the end point, the server will send the whole uncompleted streaming to the terminal. If the query message has both start point and end point, the server will deliver the streaming between start point and end point to the terminal. |
| TimeStamp_end | Time stamp for the end point | Specifies from which time stamp that terminal expect to end streaming over IA |

Table 15 arranges the query message format for the handover in the process of the streaming.

The access point for the query message is carried and signaled by a new fragment HandoverForStreaming or the acquisition fragment, in the ESG.

When the access point for requesting the streaming is signaled in the acquisition fragment. An example of an acquisition fragment is shown below in Table 16.

TABLE 16

```
<complexType name="AcquisitionType">
<sequence>
<element name="ComponentDescription" type="esg:ComponentDescriptionType"
maxOccurs="unbounded"/>
<element name="ZappingSupport" type="esg:ZappingSupportType" minOccurs="0"/>
<element name="KeyStream" type="esg:KeyStreamBaseType" minOccurs="0"
maxOccurs="unbounded"/>
</sequence>
<attribute name="contentMimeType" type="mpeg7:mimeType" use="required"/>
<attribute name="acquisitionID" type="anyURI" use="required"/>
</complexType>
<complexType name="ComponentDescriptionType">
<sequence>
<element name="ComponentCharacteristic" type="esg:ComponentCharacteristicType" minOccurs="0"
maxOccurs="unbounded"/>
<element name="SessionDescription" type="esg:SessionDescriptionBaseType"/>
<element name="StreamingHandoveroIAAccessPoint" type="anyURI"/>
</sequence>
</complexType>
```

Table 16 shows the acquisition fragment syntax, which is described below in Table 17.

TABLE 17

| Field | Semantics |
| --- | --- |
| ComponentDescription | Describes a component of a service with respect to the characteristic of the component and the session in which the component is available.<br>Note that an acquisition fragment can contain multiple ComponentDescriptions. For instance an indicated application can consume streaming components such as audio and video as well as download components such as interactive applications. |

TABLE 17-continued

| Field | Semantics |
| --- | --- |
| | In this case the streaming components are described by one ComponentDescription with a SessionDescription and two ComponentCharacteristic fields, one for audio and another one for video. A second ComponentDescription is instantiated for the download component describing the download session and the characteristic of the download components. |
| ComponentCharacteristic | Specifies the description of the component characteristic specific to the instance accessible by the instantiated acquisition information. |
| SessionDescription | Contains inlined SDP file which either directly describes the content session or the session carrying an SDP file that describes the content session. |
| StreamingHandoveroIAAccessPoint | Specifies the access point for the terminal to query the uncompleted streaming over interactive network. |
| ZappingSupport | If specified indicates that zapping support of a specified Type is available for the acquisition described in the Acquisition Fragment. The field provides a specification of the type of zapping support and a reference to the session description (see section 5.10.5). |
| KeyStream | Signals all available key streams for a given Acquisition Fragment required for decryption as described in section 5.10.6. The mapping of key streams to media streams is described in [5]. |
| acquisitionID | Specifies a unique identifier of the instantiated Acquisition Fragment. For the scope of uniqueness see the semantics of serviceID in section 5.4.2. |
| contentMimeType | Specifies the content type from which the terminal can determine the consuming application of the service. |

Table 17 arranges the acquisition fragment semantics.

Figure 23:
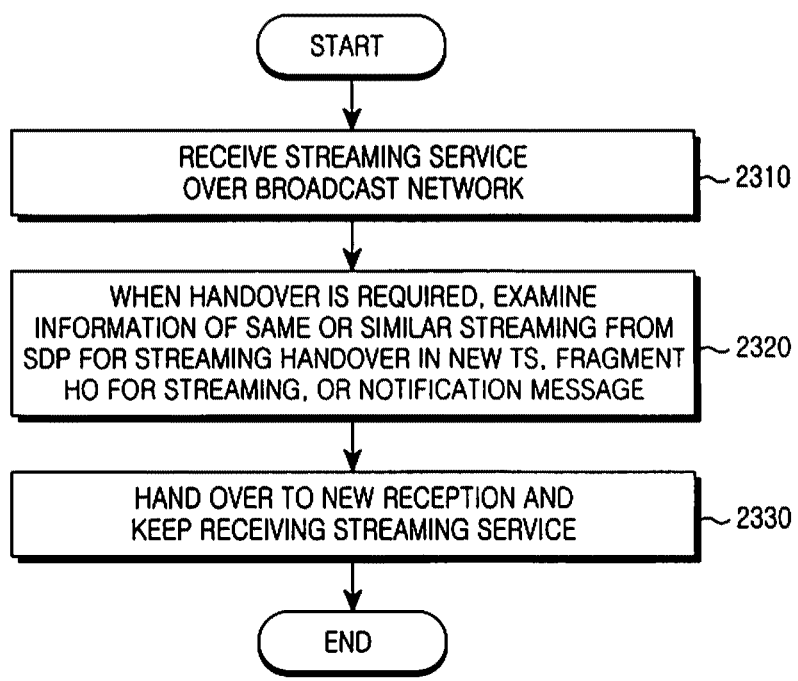
FIG. 23 is a flowchart illustrating an operation of a terminal for streaming solution 1 according to an embodiment of the present invention.

FIG. 23 is a flowchart illustrating an operation of a terminal for streaming Solution 1 according to an embodiment of the present invention.

Referring to FIG. 23, as receiving the streaming service from the current reception in step 2310, the terminal may need to hand over to the interactive network.

In step 2320, the terminal identifies the streaming information in a TS of a new reception from a new SDP for the streaming handover, the fragment HandoverForStreaming, or the notification message. Accordingly, the terminal performs the handover and is able to continue the streaming in the new TS in step 2330.

Figure 24:
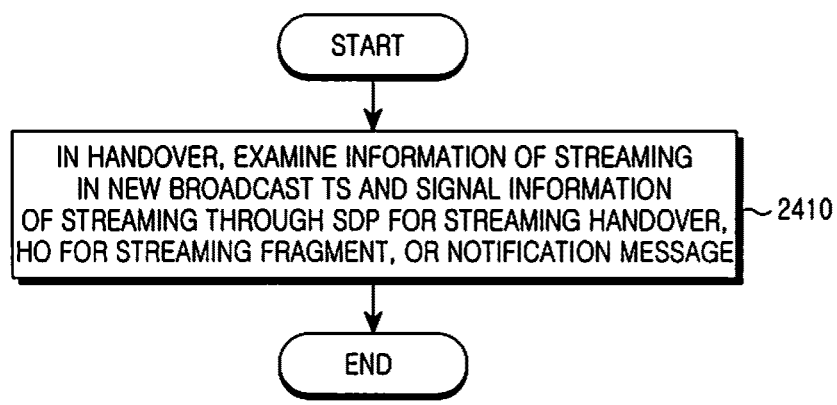
FIG. 24 is a flowchart illustrating an operation of a server for streaming solution 1 according to an embodiment of the present invention.

FIG. 24 is a flowchart illustrating an operation of a server for streaming Solution 1 according to an embodiment of the present invention.

Referring to FIG. 24, in step 2410, the server examines information relating to streaming of a new reception source in the handover, and signals the information to the terminal through the new SDP for the streaming handover, the fragment HandoverForStreaming, or the notification message.

Figure 25:
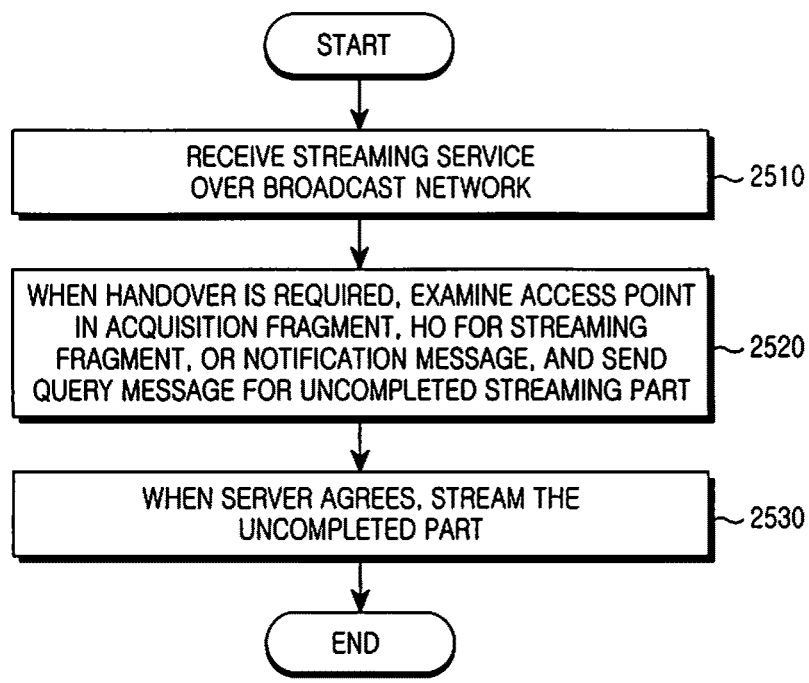
FIG. 25 is a flowchart illustrating an operation of a terminal for streaming solution 2 according to an embodiment of the present invention.

FIG. 25 is a flowchart illustrating an operation of a terminal for streaming Solution 2 according to an embodiment of the present invention.

Referring to FIG. 25, when receiving the streaming service from the current reception in step 2510, the terminal may need to hand over to an interactive network.

In step 2520, the terminal identifies access point information of the interactive network for an uncompleted streaming from an acquisition fragment, a fragment HandoverForStreaming, or the notification message, and then sends a query message. In step 2530, the terminal begins to receive the streaming of the uncompleted part over the interactive network.

Figure 26:
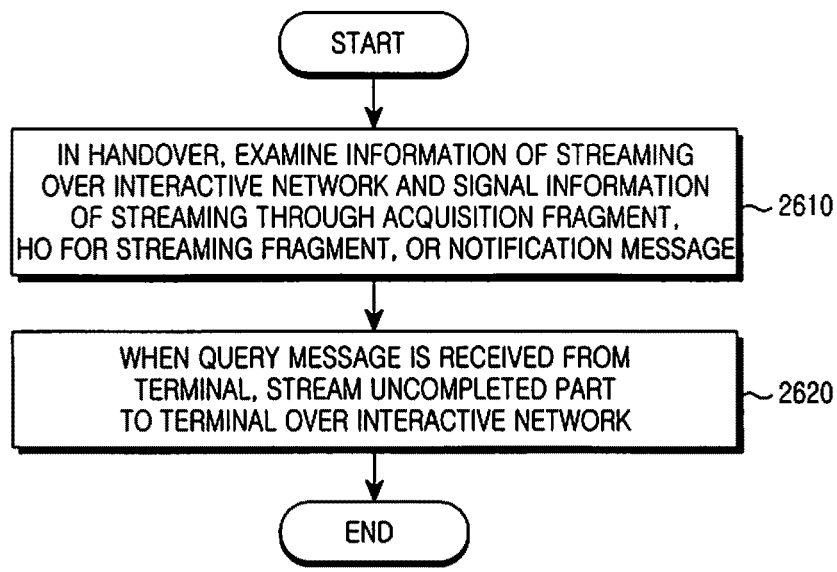
FIG. 26 is a flowchart illustrating an operation of a server for streaming solution 2 according to an embodiment of the present invention.

FIG. 26 is a flowchart illustrating an operation of a server for streaming Solution 2 according to an embodiment of the present invention.

Referring to FIG. 26, in step 2610, the server examines information relating to streaming over an interactive network, and signals access point information to a terminal through an acquisition fragment, a fragment HandoverForStreaming, or a notification message.

Upon receiving a query message, the server can transmit the streaming of an uncompleted part to the terminal over the interactive network in step 2620.

Figure 27:
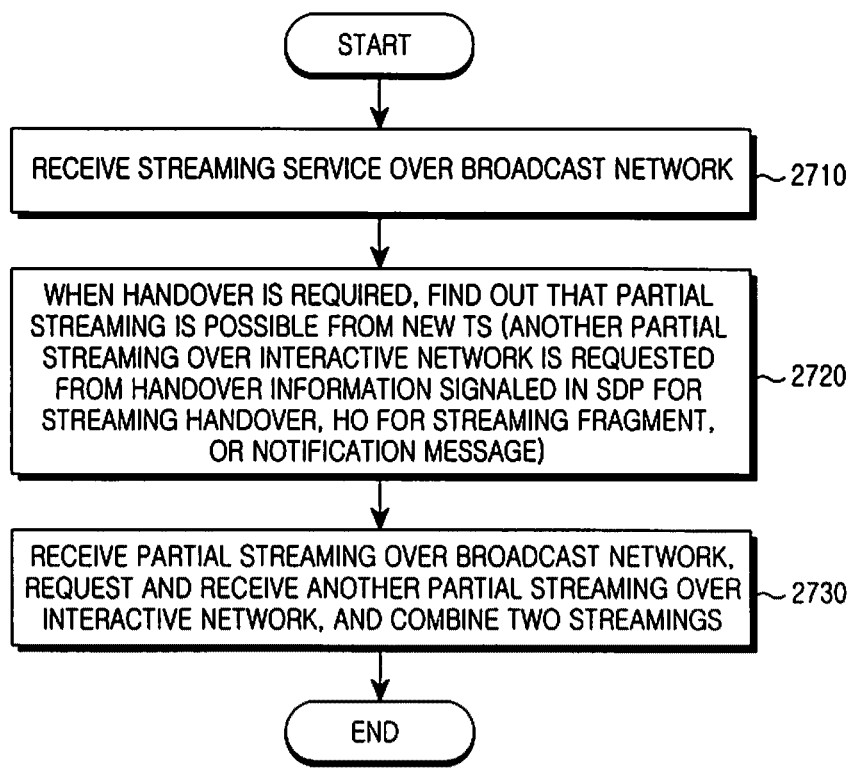
FIG. 27 is a flowchart illustrating an operation of a terminal for streaming solution 3 according to an embodiment of the present invention.

FIG. 27 is a flowchart illustrating an operation of a terminal for streaming Solution 3 according to an embodiment of the present invention.

Referring to FIG. 27, when receiving the streaming service from the current reception in step 2710, the terminal may hand over to an interactive network.

In step 2720, the terminal identifies a corresponding part (e.g., a video) of the streaming in a new TS of a new reception, from handover information of a new SDP, a HandoverForStreaming, or a notification message.

In step 2730, the terminal receives the corresponding part (the video) of the streaming from the new TS, requests another streaming (e.g., the audio) over the interactive network, and combines the two streamings.

Figure 28:
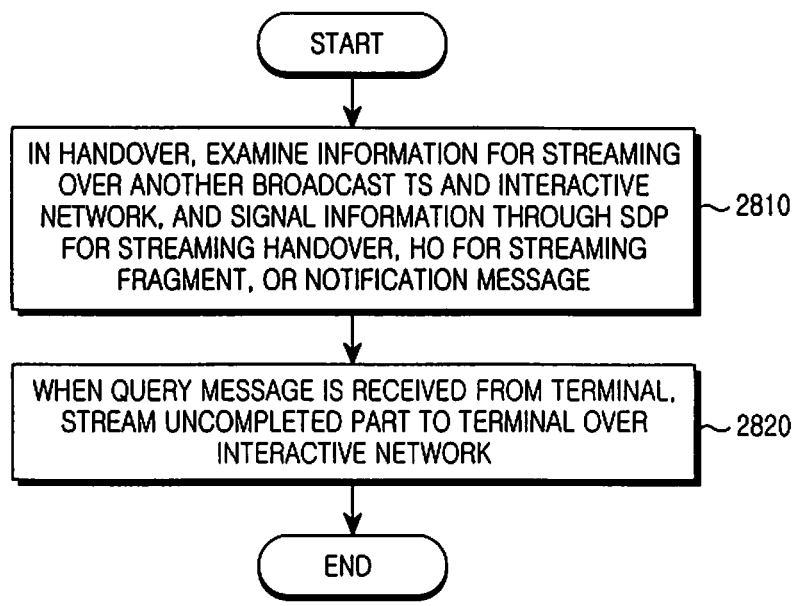
FIG. 28 is a flowchart illustrating an operation of a server for streaming solution 3 according to an embodiment of the present invention.

FIG. 28 is a flowchart illustrating an operation of a server for streaming Solution 3 according to an embodiment of the present invention.

Referring to FIG. 28, for a handover to an interactive network, the server examines information relating to streaming of a different TS, and signals the information to the terminal through an SDP for the streaming handover, a fragment HandoverForStreaming, or a notification message in step 2810.

When receiving a query message, the server streams as requested by the terminal in step 2820.

Figure 29:
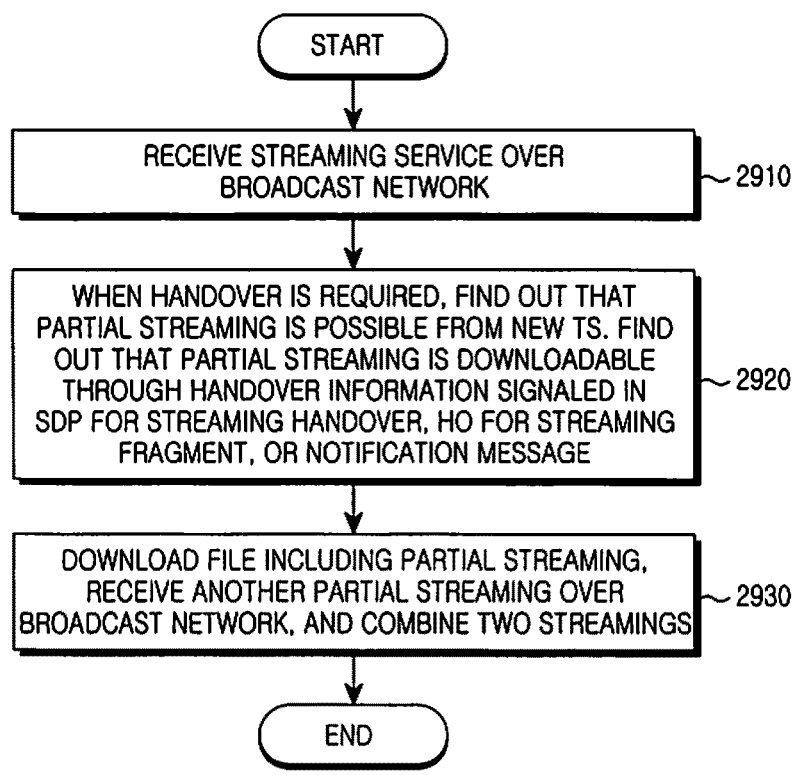
FIG. 29 is a flowchart illustrating an operation of a terminal for streaming solution 4 according to an embodiment of the present invention.

FIG. 29 is a flowchart illustrating an operation of a terminal for streaming Solution 4 according to an embodiment of the present invention.

Referring to FIG. 29, when receiving a streaming service from a current reception in step 2910, the terminal may hand over to an interactive network.

In step 2920, the terminal identifies a part of a streaming of a different TS, from handover information of a new SDP, a fragment HandoverForStreaming, or a notification message. For example, the part of the streaming is included in a downloadable file.

In step 2930, the terminal receives the part of the streaming in the new TS, downloads the file including the streaming, and then combines the two streamings.

Figure 30:
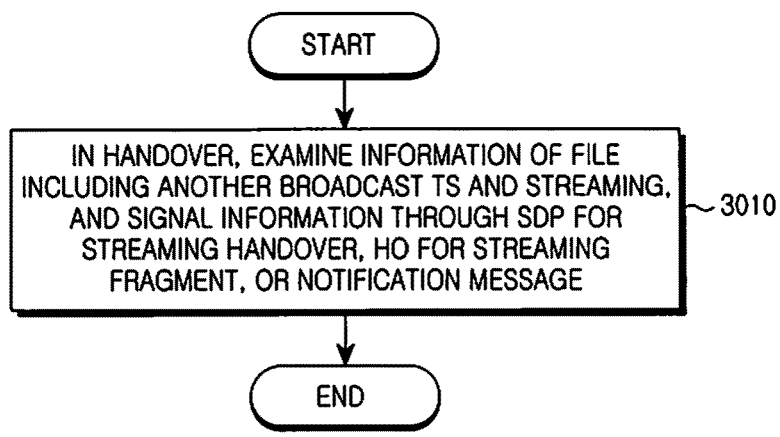
FIG. 30 is a flowchart illustrating an operation of a server for streaming solution 4 according to an embodiment of the present invention.

FIG. 30 is a flowchart illustrating an operation of a server for streaming Solution 4 according to an embodiment of the present invention.

Referring to FIG. 30, in step 3010, for a handover, the server examines information for streaming of a different TS and information of a file including the streaming, and signals the information to the terminal through an SDP for the streaming handover, a fragment HandoverForStreaming, or a notification message.

As described above, the embodiments of the present invention, although described in conjunction with a handover, are equally applicable to roaming. The operations of the terminal for the method using the new information are flexible. The terminal can determine the new information relating to the same or similar service (to be serviced to the terminal) in advance or if necessary.

This information can be used when the service is provided. For instance, when the terminal receives one service but the service quality deteriorates, the terminal can determine the same or new service in the different reception.

The checking can use the information newly signaled from the ESG, the notification, or the query. When successfully checking the new reception, the terminal can change to the new reception to access to the service.

The information can be used when the terminal commences the service from the different reception. For example, the terminal can access one service in one reception. In a different reception, the terminal acquires and stores the information of the same or similar service from the signaling information of the present invention. Next, the user can move to another country (or another reception), and the information relating to the previous reception may not exist at the terminal any more.

When the user wants to receive the same or similar service, the information of the same or similar service can be acquired from the information stored to the terminal or determined by the terminal by requesting to the network. Next, the terminal can search and receive the same or similar service in the current reception.

Alternatively, the information mapped by the current ESG of a current new reception, a notification, or another signaling can be signaled to the terminal. Based on the signaled information, the terminal can determine whether there is its desired service.

The location of a new signaling in the ESG may vary. For example, the new signaling can exist in areas other than the acquisition fragment, such as a service fragment as shown in the following table.

TABLE 18

```
<!-- targetNamespace="urn:dvb:ipdc:esg:2005" >
<complexType name="ServiceType">
<sequence>
<element name="ServiceName" type="tva:ServiceInformationNameType"
maxOccurs="unbounded"/>
<element name="ServiceNumber" type="unsignedShort" minOccurs="0"/>
<element name="ServiceLogo" type="mpeg7:TitleMediaType" minOccurs="0"
maxOccurs="unbounded"/>
<element name="ServiceDescription" type="tva:SynopsisType" minOccurs="0"
maxOccurs="unbounded"/>
<element name="ServiceGenre" type="tva:GenreType" minOccurs="0" maxOccurs="unbounded"/>
<element name="ServiceType" type="tva:ControlledTermType" minOccurs="0"
maxOccurs="unbounded"/>
<element name="ParentalGuidance" type="mpeg7:ParentalGuidanceType" minOccurs="0"
maxOccurs="unbounded"/>
<element name="ServiceLanguage" type="language" minOccurs="0" />
<element name="ServiceProvider" type="esg:ProviderType" minOccurs="0" />
<element name="AcquisitionRef" type="esg:AcquisitionRefType" minOccurs="0"
maxOccurs="unbounded"/>
<element name="RelatedMaterial" type="esg:RelatedMaterialType" minOccurs="0"
maxOccurs="unbounded"/>
<element name="PrivateData" type="esg:PrivateDataType" minOccurs="0"
maxOccurs="unbounded" />
<element name="MappingService" type=" MappingServiceType" minOccurs="0"/>
</sequence>
<attribute name="serviceID" type="anyURI" use="required"/>
<attribute name="freeToAir" type="boolean" use="optional"/>
<attribute name="clearToAir" type="boolean" use="optional"/>
</complexType>
<complexType name=" MappingServiceType">
<sequence>
<element name="MappingProviderURI" type="anyURI"/>
<element name="MappingESGURI" type="anyURI"/>
<element name="MappingServiceID" type="anyURI"/>
<element name="ServiceRelationshipType" type="tva:ControlledTermType" minOccurs="0"
maxOccurs="unbounded"/>
</sequence>
</complexType>>
```

The detailed descriptions of the semantics of Table 18 are described in the ESG standard (ts_102471v010301p, chapter 5.4.2). The bold letters are the newly added elements.

MappingServiceType is the signaling for the mapping service identifier (identified by MappingServiceID) in the different ESG (identified by MappingProviderURI and MappingESGURI) and the signaling for the relationship between the services.

The relationship is detailed in ClassificationScheme. In the relationship, variations or related things to the relationship can be the same. When there are variations, the variations may be written in a different language or subtitle or captured by a different camera. The present invention does not limit the listed relationship.

When the indication for the further relationship is necessary, the relationship can be freely extended. A ClassificationScheme for a ServiceRelationshipType is shown in the following table.

TABLE 19

<ClassificationScheme uri="urn:dvb:ipdc:esg: cs:
ServiceRelationshipTypeCS:>
<Term termID="1.0"<Name xml:lang="en"> Service relationship
Type</Name>
<Definition xml:lang="en">Type of service relationship, e.g. identical,
variation, and associated</Definition>
<Term termID="1.1">
<Name xml:lang="en">Identical Service</Name>
<Definition xml:lang="en">Identical service</Definition>
</Term>
<Term termID="1.2" </Name>
<Name xml:lang="en">Variation Service</Name>
<Definition xml:lang="en">Service with Variation</Definition>
<Term termID="1.2.1>
<Name xml:lang="en">service with different language</Name>
<Definition xml:lang="en">A service with different
language</Definition>
</Term>
<Term termID="1.2.2>
<Name xml:lang="en">service different subtitle</Name>
<Definition xml:lang="en">A service with different subtitle</Definition>
</Term>
<Term termID="1.2.3>
<Name xml:lang="en">service different camera</Name>
<Definition xml:lang="en">A Service with different camera</Definition>
</Term>
</Term>
<Term termID="1.3" >
<Name xml:lang="en">Associated Service</Name>
<Definition xml:lang="en"> Associated service</Definition>
</Term>
</Term>

Structures of the terminal and the server for the streaming are illustrated. The server for the streaming is described by referring to FIG. 14.

In FIG. 14, the service application part 1410 aggregates the content and their metadata from various sources to provide a service application. The service application part 1410 provides head-end application logic. The service application part 1410 provides the content encoded to be read by the terminal through the streaming or the file delivery.

The service application part 1410 generates the service description metadata used in the ESG, and interacts with the terminal for the service application. Also, the service application part 1410 performs the service protection function. The service application part 1410 can be provided for each application offered by the IP datacast. The service manager 1420 includes the service guide provisioning application part 1422, the service setter and allocator 1424, the security/service protection provision part 1426, and the location service part 1428.

The service guide provisioning application part 1422 aggregates the ESGs, which are the metadata information, from the service applications.

The service setter and allocator 1424 registers the service application that requests the bandwidth of the broadcasting. For example, the service setter and allocator 1424 registers a DVB-H IP platform of a DVB transport stream. Also, the service setter and allocator 1424 allocates the service based on the place, allocates the bandwidth based on the time, and allocates the service schedule. The service setter and allocator 1424 manages the sub-entities in relation to the broadcasting bandwidth contention.

The security/service protection provision part 1426 controls the access of a user to the service application.

The location service part 1428 provides the interaction bearer network functionality or the location service including the GPS service, as the service applications.

The service application can be transmitted over the broadcast network 1430.

When the terminal hands over, the service manager 1420 enables the terminal to keep receiving the streaming service. To expedite this, the service manager 1420 transmits the aforementioned information to the terminal. When the terminal requests the streaming service, the service manager 1420 offers the corresponding streaming service. In various implementations, the service application part 1410 can function as the service manager 1420.

The terminal for the streaming is illustrated by referring to FIG. 15.

In FIG. 15, the broadcast receiver 1520 receives the PSI/SI, the ESG, and the service application over the broadcast network. The interactive adaptor 1530 receives the service application over the interactive network or exchanges the signaling information with the server. The MM 1540 provides the mobile service to the terminal. Particularly, when the information for the streaming reception in the handover is received from the server, the MM 1540 controls the broadcast receiver 1520 to promptly receive the streaming reception using the received information after the handover.

The MM 1540 controls the terminal to receive the notification message from the server through the interactive adaptor 1530, to hand over after acquiring the information for the streaming reception in the handover from the notification message, and to promptly perform the streaming reception.

The MM 1540 controls the interactive adaptor 1530 to send the query message and to thus request the information for the streaming reception in the handover.

The subscription manager 1550 acquires the right for the service application, tracks the right determined by the terminal, and decodes the encoded service content.

The content consumer 1560 consumes the content, i.e., reproduces the corresponding content.

Advantageously, even after roaming or a handover, a terminal in accordance with an embodiment of the present invention can promptly download the file being downloaded. Further, the terminal can quickly receive a streaming, after roaming or a handover.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus of a server for managing streaming roaming and a handover in a wireless communication system, the apparatus comprising:

a processor for:
adding a new Session Description Protocol (SDP) or a new fragment to an Electronic Service Guide (ESG), or generating a notification message, when the streaming roaming or the handover occurs,
receiving a query message from the terminal,
transmitting the ESG, including the new SDP or the new fragment, or the notification message to a terminal, and
transmitting a part of an uncompleted streaming download to the terminal, when the query message indicates that transmission of the part of the uncompleted streaming download is permitted;
wherein the new SDP, the new fragment, and the notification message include access information for receiving a same or similar file when the handover or the roaming occurs, and
wherein the new fragment and the notification message include information of sequence number and time stamp for continuous streaming of uncompleted streaming.

2. The apparatus of claim 1, wherein the processor generates one of the new SDP, the new fragment, and the notification message indicating that a partial streaming download transmission is permitted, sends one of the new SDP, the new fragment, and the notification message to the terminal, and transmits a file, including a requested part of an uncompleted streaming download to the terminal, when a query message is received from the terminal.

3. The apparatus of claim 1, wherein the processor generates one of the new SDP, the new fragment, and the notification message indicating that a streaming download is permitted, sends one of the new SDP, the new fragment, and the notification message to the terminal, and transmits a file, including the streaming download to the terminal.

4. An apparatus of a terminal for performing streaming roaming and a handover in a wireless communication system, the apparatus comprising:
a mobility manager for controlling the terminal to:
receive, through a broadcast receiver, an Electronic Service Guide (ESG) or a notification message, when the streaming roaming or the handover occurs,
transmit a query message, to a server, through an interactive adaptor, requesting a part of an uncompleted streaming download, and
receive the part of the uncompleted streaming download using an access point through an interactive adaptor;
wherein the ESG includes one of a new Session Description Protocol (SDP) and a new fragment,
wherein the new SDP, the new fragment and the notification message include access information for receiving a same or similar file when the streaming roaming or the handover occurs, and
wherein the new fragment and the notification message include information of sequence number and time stamp for continuous streaming of uncompleted streaming.

5. The apparatus of claim 4, wherein the mobility manager controls the terminal to receive, through the broadcast receiver, one of the new SDP, the new fragment, and the notification message indicating that a partial streaming download transmission is permitted, and to send a query message, to a server, through an interactive adaptor, requesting a part of an uncompleted streaming download, and incorporates the requested part of the uncompleted streaming download and a currently broadcast streaming download, after performing the streaming roaming or the handover.

6. The apparatus of claim 4, wherein the mobility manager controls the terminal to receive, through the broadcast receiver, one of the new SDP, the new fragment, and the notification message indicating that a streaming download is permitted, and to receive, through an interactive adaptor, a file including a part of an uncompleted streaming download, and incorporates the file including the part of the uncompleted streaming download with a currently broadcast streaming download, after performing the streaming roaming or the handover.

7. A method of performing streaming roaming and a handover in a wireless communication system including a server, the method comprising:
adding, by the server, a new Session Description Protocol (SDP) or a new fragment to an Electronic Service Guide (ESG), or generating a notification message, when the streaming roaming or the handover occurs;
receiving a query message from the terminal;
transmitting, by the server, the ESG, including the new SDP or the new fragment, or the notification message, to a terminal; and
transmitting a part of an uncompleted streaming download to the terminal, when the query message indicates that transmission of the part of the uncompleted streaming download is permitted,
wherein the new SDP, the new fragment and the notification message include access information for receiving a same or similar file when the streaming roaming or the handover occurs, and
wherein the new fragment and the notification message include information of sequence number and time stamp for continuous streaming of uncompleted streaming.

8. The method of claim 7, further comprising: generating one of the new SDP, the new fragment, and the notification message indicating that a partial streaming download transmission is permitted;
sending the one of the new SDP, the new fragment, and the notification message to the terminal; and
transmitting a requested part of an uncompleted streaming download to the terminal, when a query message is received from the terminal.

9. The method of claim 7, further comprising: generating one of the new SDP, the new fragment, and the notification message indicating that a streaming download is permitted;
sending the one of the new SDP, the new fragment, and the notification message to the terminal; and
transmitting a file, including the streaming download, to the terminal.

10. A method for performing streaming roaming and a handover in a wireless communication system including a terminal, the method comprising:
receiving, by the terminal, a Electronic Service Guide (ESG) or a notification message, when the streaming roaming or the handover occurs;
transmitting a query message, to a server, requesting a part of an uncompleted streaming download; and
receiving the part of the uncompleted streaming download using an access point,
wherein the ESG includes one of a new Session Description Protocol (SDP) and a new fragment,
wherein the new SDP, the new fragment and the notification message include access information for receiving a same or similar file when the streaming roaming or the handover occurs, and
wherein the new fragment and the notification message include information of sequence number and time stamp for continuous streaming of uncompleted streaming.

11. The method of claim 10, further comprising:

receiving one of the new SDP, the new fragment, and the notification message indicating that a partial streaming download is permitted;

sending a query message, to a server, requesting a part of an uncompleted streaming download; and incorporating the requested part of the uncompleted streaming download with a part of a currently broadcast streaming download, after performing the streaming roaming or the handover.

12. The method of claim 10, further comprising:

receiving one of the new SDP, the new fragment, and the notification message indicating that a streaming download is permitted;

receiving a file, including part of an uncompleted streaming download; and incorporating the file, including the part of the uncompleted streaming download with a currently broadcast streaming download, after performing the streaming roaming or the handover.

\* \* \* \* \*